(12) United States Patent
Guerrero et al.

(10) Patent No.: US 11,194,470 B2
(45) Date of Patent: Dec. 7, 2021

(54) SYSTEMS AND METHODS FOR IMPLEMENTING A DYNAMIC AND CONTEXTUAL ON SCREEN KEYBOARD

(71) Applicant: DELL PRODUCTS L.P., Round Rock, TX (US)

(72) Inventors: Fernando L. Guerrero, Round Rock, TX (US); Hariprasad J. Iyer, Round Rock, TX (US); Danilo O. Tan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 16/833,634

(22) Filed: Mar. 29, 2020

(65) Prior Publication Data

US 2021/0303147 A1    Sep. 30, 2021

(51) Int. Cl.
*G06F 3/0488* (2013.01)

(52) U.S. Cl.
CPC ................................ *G06F 3/04886* (2013.01)

(58) Field of Classification Search
CPC .. G06F 3/04886; G06F 1/1664; G06F 3/0216; G06F 3/03547; G06F 2203/04104
See application file for complete search history.

(56) References Cited

U.S. PATENT DOCUMENTS

| | | | |
|---|---|---|---|
| 8,564,545 B2* | 10/2013 | Chen | G06F 3/04886 345/173 |
| 9,448,642 B2 | 9/2016 | Law et al. | |
| 9,448,724 B2 | 9/2016 | Arnold | |
| 10,545,663 B2* | 1/2020 | Yoon | G06F 3/04886 |
| 2012/0050187 A1* | 3/2012 | Chen | G06F 3/04886 345/173 |
| 2013/0027434 A1* | 1/2013 | Paul | G06F 3/04883 345/660 |
| 2013/0088439 A1 | 4/2013 | Shih et al. | |
| 2013/0285926 A1* | 10/2013 | Griffin | G06F 3/04886 345/173 |
| 2014/0218298 A1 | 8/2014 | Law et al. | |
| 2015/0363008 A1* | 12/2015 | VanBlon | G06F 1/1686 345/158 |
| 2016/0085440 A1* | 3/2016 | Canoy | G06F 1/1664 715/773 |
| 2016/0209928 A1* | 7/2016 | Kandur Raja | G06F 3/04886 |
| 2017/0277428 A1* | 9/2017 | Murayama | G06F 3/0425 |
| 2018/0314376 A1 | 11/2018 | Chen et al. | |

(Continued)

OTHER PUBLICATIONS

Dell, "Dell Canvas Palettes", User's Guide, 2017, 12 pgs.

(Continued)

*Primary Examiner* — Rodney Amadiz
(74) *Attorney, Agent, or Firm* — Egan, Enders & Huston LLP.

(57) ABSTRACT

Systems and methods are provided that may be implemented to detect placement and/or force of a users' fingers on a touch surface of a touchscreen display of an information handling system, and to present an on-screen keyboard or onscreen keypad according to the user needs and/or desires (keyboard or keypad size, keyboard or keypad type, keyboard or keypad location) based on the detected finger placement and/or finger force to optimize usage of the displayed on-screen keyboard.

24 Claims, 13 Drawing Sheets

(56) References Cited

U.S. PATENT DOCUMENTS

2018/0321779 A1 11/2018 Huang
2019/0239384 A1 8/2019 North

OTHER PUBLICATIONS

University Of California—San Diego, "Researchers Develop Thin, Transparent And Lightweight Touchscreen Pressure Sensor Arrays", 2018, 5 pgs.
Google.Com, "Swipe Keyboard—Apps on Google Play", Printed from Internet Mar. 13, 2020, 2 pgs.
Apkpure, "Swype Keyboard Free", 2018, 3 pgs.
Amazon.com, "Swype Keyboard", 2013, 9 pgs.
Adhiya, "What Is 3D Touch And How It Works? Here Is All You Need To Know About", Printed from Internet Feb. 12, 2020, 3 pgs.

* cited by examiner

SYSTEMS AND METHODS FOR IMPLEMENTING A DYNAMIC AND CONTEXTUAL ON SCREEN KEYBOARD

FIELD

This invention relates generally to information handling systems and, more particularly, to on screen keyboards.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Use of information handling systems having a touch-enabled user interface (U/I) and that display an on-screen keyboard continue to grow. Examples of such information handling systems include tablet computers and two-in-one laptops that display a native on-screen touch keyboard as a "one-size-fits-all" solution that does not account for an individual user's unique finger positions and dimensions. A user often finds difficulty in using a conventional on-screen keyboard for high volume data or text input due to lack of feel for which keys are being contacted by the user's fingers and lack of feel for how much space exits between the displayed keys.

Force sensing touchpads and touchscreens have been employed to allow a user to input different commands to an information handling system by applying force with different levels of force to the touchpad or touchscreen.

SUMMARY

Disclosed herein are systems and methods that may be implemented to detect placement and/or applied force of a users' fingers on a touch surface of a touchscreen display of an information handling system, and to present an on-screen keyboard or onscreen keypad according to the user needs and/or desires (keyboard or keypad size, keyboard or keypad type, keyboard or keypad location) based on the detected user finger placement and/or magnitude of applied force by a user's finger/s to optimize usage of the displayed on-screen keyboard. Advantages that may be achieved in the practice of the disclosed systems and methods include, but are not limited to, dynamic on-screen touch keyboard sizing and supportable display sizes, high usage of a touchscreen surface, providing users with an optimized on-screen touch keyboard or keypad without the need to carry a separate physical keyboard.

Embodiments of the disclosed systems and method may be implemented to achieve a variety of different features, alone or in combination, on a touchscreen of an information handling system. Examples of such features include, but are not limited to, precise sizing of an on-screen touch keyboard or keypad using combination of touch point locations, touch point force magnitude, and touch point density data; precise control of the identity of keys and/or functions shown on the on-screen touch keyboard and/or keypad (e.g., based on pre-defined user, system manufacturer or system assembler configuration); ability to support a variety of on-screen touch keyboard types and/or sizes based on detected user's physical characteristics; use of a force-sensing touch surface to accurately determine user's physical characteristics and show appropriate on-screen touch keyboard keypad that is tailored to these user's determined physical characteristics; easy launch of an on-screen touch keyboard or keypad by placement of fingers (including thumbs) anywhere on the screen; placement of an on-screen touch keyboard or keypad under the touch location/s of the user's fingers as they are placed on a touchscreen; customizable keyboards appearing for specific applications automatically (e.g., based on pre-defined user configuration).

Example on-screen touch keyboard or keypad features that may be implemented using the embodiments disclosed herein include, but are not limited to, using a force-sensing touch surface of a touchscreen to sense magnitude of the force applied by a current user's touch to accurately determine the user's intentions, actions and/or behaviors (e.g., such as a distinguishing between a small hand performing a relatively hard and a forceful touch versus a large hand performing a relatively light and normal touch). Additional on-screen touch keyboard features that may be implemented include adjusting the size and/or position of an on-screen touch keyboard or on-screen touch keypad on a touchscreen based on detected size of a user's hands and/or placement of the user's hands relative to the touchscreen orientation. This may be employed to account for the fact that each user's hands are different from other user's hands and that everyone rests their hands at least slightly differently on a touchscreen display and a displayed on-screen touch keyboard or keypad.

In one embodiment, angle of a user's hand or palm (as well as direction and orientation of the user's hand or palm) measured with respect to the touchscreen display and/or with respect to the other hand or palm of the user may be calculated to determine a custom ergonomic keyboard layout to display for each hand of the given user, e.g., a unitary full keyboard having may be displayed (when two user's hands are positioned relatively close to each other) or two split keyboard segments may be displayed (e.g., when two user's hands are positioned relatively far apart from each other). In one embodiment, angle or rotation of a user's two hands placed on a touchscreen relative to each other may be sensed and used to determine whether or not to display one or more angled keyboard/s, e.g., a unitary keyboard may be displayed with two inwardly angled segments as a "Wave" style keyboard, and a split keyboard may be displayed as two keyboard segments that are angled in and point toward each other in a manner to help alleviate stress on the user's hand, palms and/or wrist.

In one exemplary embodiment, placement and magnitude of the force applied by a current user's fingers on a force-sensitive touchscreen may be sensed and used to create touch data (e.g., by a touch controller). The resulting touch data from the touch controller may then be used (e.g., by an application service executing on the host programmable integrated circuit) to detect the user's dynamic finger placement and magnitude of force applied by one or more of their fingers on the touchscreen to determine information such as number of user's fingers placed on the touchscreen, distance between the users' fingers on the touchscreen, density of each user touch point on the touchscreen, magnitude of force applied by the user to each user touch point on the touchscreen, etc. Once the user's dynamic finger placement and finger force magnitude is detected, the placement and force data may be used (e.g., by the application service) together to determine what type and size of on-screen touch keyboard together with individual key size to present to the current user.

In one exemplary embodiment, layout of a provided on-screen touch keyboard or keypad may be further determined based on characteristics of the hardware being currently used by the user. For example, keyboard size and/or displayed keyboard keys of an on-screen touch keyboard may be determined based on touch and/or display area dimensions of the current touchscreen hardware display. In one embodiment, a reduced-function on-screen touch keyboard or keypad may be displayed that includes only a subset of all available keys when the available display area size of the current touchscreen hardware display is limited relative to the size of the original selected keyboard or keypad. For example, the displayed subset of available keys may include only those keys that are more frequently-used. In this way, less frequently-used keys (e.g., such as page up key, page down key, etc.) may be omitted from the on-screen display so as to reduce the overall keyboard or keypad size while leaving increased room on the hardware display for displaying the pre-defined more frequently-used keys. Likewise, an expanded-function and full on-screen touch keypad or keyboard may be displayed (e.g., rather than a compact or reduced-function keypad or keyboard) when the available display area size of the current touchscreen hardware display is determined to be sufficiently large relative to the size of the original selected keyboard or keypad. Such an expanded-function full touch keypad or keyboard may include the omitted additional keys of the reduced-function keyboard or keypad (e.g., function keys, specialized keys, page up and page down keys, etc.).

In one exemplary embodiment, the identity of keys and/or functions that are currently displayed as an on-screen touch keyboard may be controlled by a user in advance. For example, identity of particular keys of a provided on-screen touch keyboard may be further determined based on the type of foreground application currently being executed on the information handling system and currently used by the user. In this regard, a specific user-customized keyboard may be specified and pre-defined by a user for a given application and saved for future automatic display when that given application is executing in the foreground. For example, a user may specify that an on-screen touch keyboard be displayed as a numeric touchpad rather than a text keyboard (e.g., QWERTY keyboard, Dvorak keyboard, etc.) when a spreadsheet program is executing on the system in the foreground, and that the on-screen touch keyboard be displayed as a text touch keyboard rather than a numeric touch keypad when a word processing program is executing on the system in the foreground.

In another embodiment, orientation of a displayed on-screen touch keyboard may be changed in response to a user gesture on the keyboard, e.g., changed in response to a detected circular motion and change in position of a user's index fingers on a touchscreen by re-rendering a displayed on-screen touch keyboard in a re-oriented position with its guide keys (e.g., home row F and J keys of QWERTY keyboard) displayed under the new position of the user's index fingers.

In one respect, disclosed herein is a method, including: sensing a presence and location of each of one or more touch points applied by a user to a touchscreen display of an information handling system, each of the user touch points corresponding to a location of a user finger touching the touchscreen; sensing a magnitude of force applied to the touchscreen display at each of the user touch points; determining a key size based on the sensed magnitude of force; and displaying a selected keyboard or keypad having multiple keyboard keys of the determined key size on the touchscreen display.

In another respect, disclosed herein is an information handling system, including: a touchscreen display displaying visual images and generating signals representative of a sensed location and magnitude of force applied to each of one or more touch points by a user to the touchscreen display; and at least one programmable integrated circuit coupled to the touchscreen display, the at least one programmable integrated circuit providing signals generating the visual images on the touch screen display and receiving the signals from the touchscreen display representative of the sensed location and magnitude of force applied to each of the one or more touch points by the user to the touchscreen display. The at least one programmable integrated circuit may be programmed to: determine a key size based on the sensed magnitude of force; and display a selected keyboard or keypad having multiple keyboard keys of the determined key size on the touchscreen display.

BRIEF DESCRIPTION OF THE DRAWINGS

FIG. 2A-1 illustrates methodology according to one exemplary embodiment of the disclosed systems and methods.

FIG. 2A-2 illustrates methodology according to one exemplary embodiment of the disclosed systems and methods.

DESCRIPTION OF ILLUSTRATIVE EMBODIMENTS

Figure 1:
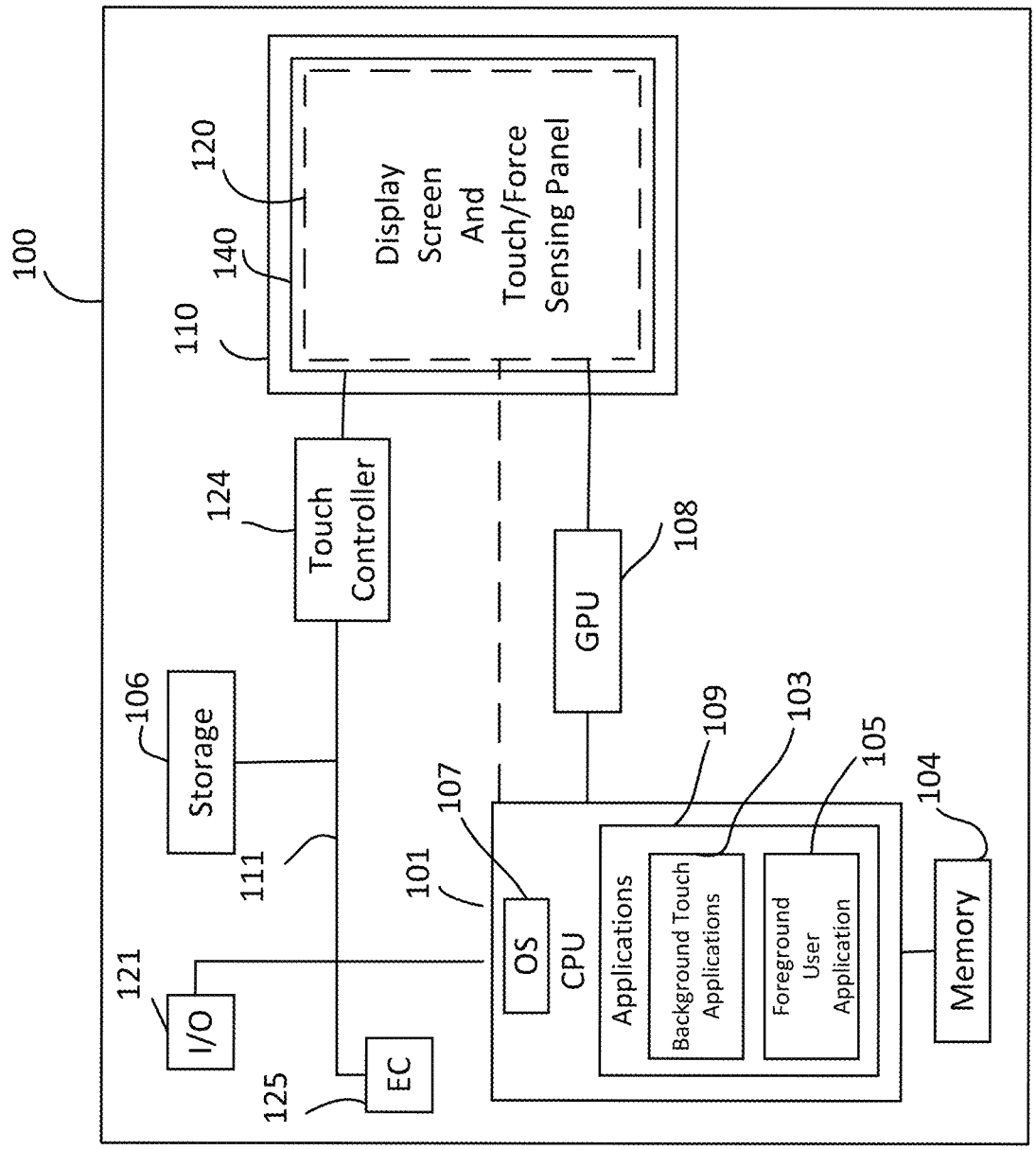
FIG. 1 illustrates a block diagram of an information handling system according to one exemplary embodiment of the disclosed systems and methods.

FIG. 1 illustrates a block diagram of an information handling system 100 as it may be configured according to one exemplary embodiment of the disclosed systems and methods. Information handling system 100 may be a portable or non-portable computer device having a touchscreen display 110 communicatively-coupled to other components of the information handling system 100 as described further herein. Examples of portable information handling systems include, but are not limited to, battery-powered portable systems such as laptop computers, notebook computers, tablet computers, smart phones, etc. Examples of non-portable information handling systems include, but are not limited to, systems such as desktop or tower computers, servers, etc. that may be AC-mains powered. In some embodiments, touchscreen display 110 may be a discrete component that is coupled by a separate data bus, such as a universal serial bus (USB) to other system components integrated and contained within a separate chassis of an information handling system 100 (e.g., such as a desktop computer, tower computer, server, etc.). In some embodiments, touchscreen display 110 may be a component that is integrated and contained with other system components within the same chassis of an information handling system 100 (e.g., such as a laptop computer, notebook computer, tablet computer, smart phone, etc.).

As shown in the embodiment of FIG. 1, information handling system 100 includes at least one host programmable integrated circuit configured in this embodiment as a central processing unit (CPU) 101 that executes an operating system (OS) 107 and applications (e.g., background touch application 103 and foreground user application 105) for system 100. Host programmable integrated circuit 101 may be, for example, an Intel Xeon series processor, an Advanced Micro Devices (AMD) processor or another type of processing device. CPU 101 is also shown coupled to other system components via data bus 111 (e.g., universal serial bus "USB" or other suitable data path), which in one embodiment may include an optional platform controller hub (PCH) that facilitates input/output functions for information handling system 100. An embedded controller (EC) 125 may also be present to perform system tasks including, but not limited to, controlling operation of power supply/voltage regulation circuitry, cooling fan/s, power throttling of CPU 101, etc.

Also shown in FIG. 1A is a graphics processing unit (GPU) 108 that is coupled in signal communication with CPU 101 (e.g., by conductor including PCI-Express lanes, power supply bus, power, thermal and system management signals, etc.) that transfers instructions and data for generating video images from CPU 101 to the GPU 108. GPU 108 may be an NVidia GeForce series processor, an AMD Radeon series processor, or another type of processing device that is configured to perform graphics processing tasks based on the instructions and data received from CPU 101 and to provide output digital video signals (e.g., as frame buffer data) via video data bus or data conductors (e.g., HDMI, DVI, SVGA, VGA, etc.) to render a video image for display to a user on an active display screen area 120 (e.g., LCD or LED display screen or other suitable display screen type) of touchscreen display 110. It will be understood that in other embodiments CPU 101 may alternatively provide output digital video signals directly to display screen 120, including in those cases where a GPU 108 is not present.

In the exemplary embodiment of FIG. 1, CPU 101 is shown coupled to system memory 104 via a direct data channel, although a system memory may alternatively be coupled to CPU 101 by data bus 111. System memory 104 may include, for example, random access memory (RAM), read only memory (ROM), dynamic RAM (DRAM), synchronous DRAM (SDRAM), and/or other suitable storage mediums. Local system storage 106 (e.g., one or more media drives, such as hard disk drives, optical drives, solid state drives (SSDs), other type of non-volatile random access memory "NVRAM" or Flash, or any other suitable form of internal storage) is coupled to data bus 111 to provide permanent or persistent storage for the information handling system 100. Optional input/output devices 121 (e.g., a keyboard or touchpad) may also be coupled to data bus 107 as shown to enable the user to interact with components of information handling system 100 including application programs or other software/firmware executing thereon.

Still referring to FIG. 1, touchscreen display 110 may include touch sensing circuitry 140 (e.g., capacitive layers, resistive layers technology, surface acoustic wave transducers, etc.) that define a touch-sensing area of touchscreen display 110, and that dynamically sense in real time the specific location/s (e.g., X, Y coordinate positions, etc.) where a user touches the touch-sensing area of display screen. Touch-sensing circuitry 140 may also include force-sensing circuitry that is integrated into display 110 to directly sense magnitude of force (e.g., Newtons of force) actually applied to different points of the touch-sensing area of display 110 (e.g., such as using capacitive sensors integrated within display 110 or using piezoelectric force measurement of zinc oxide-based thin-film transistor sensors integrated within display 110). As shown, touchscreen display device 125 also includes a touch controller 124 that receives and processes signals (e.g., provided as relative magnitude of generated current, resistance, voltage, etc. that is indicative of the sensed applied force and specific location/s where a user touches the touch-sensing area of display screen) from the touch sensing circuitry 140 of display 110, and in turn communicates a data signal representative of the sensed touch location/s and respective sensed touch location (touch point) force magnitude/s to CPU 101 via data bus 111.

Figures 1, 2A:
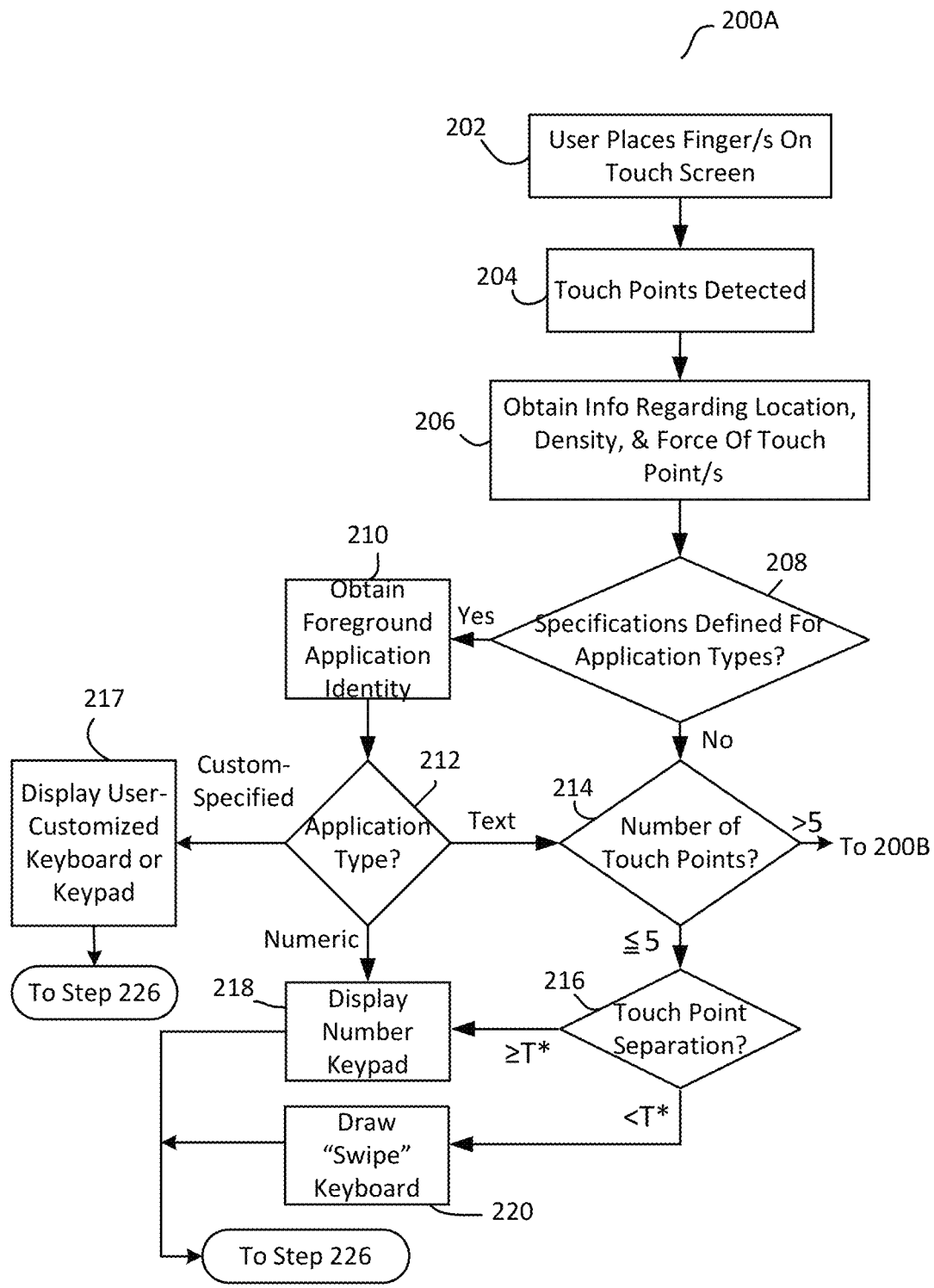

FIG. 2A illustrates a methodology 200 according to one exemplary embodiment of the disclosed systems and methods. Methodology 200 will be described below with reference to FIGS. 6, 7A, 7B, 8 and 9, and as it may be implemented using components of information handling system 100 of FIG. 1. However, it will be understood that methodology 200 may alternatively be implemented with other configurations of information handling systems having a touchscreen display. In one exemplary embodiment, all finger placement detection and service managements may be determined and executed by a software touch application 103 executing on CPU 101 within the OS layer 103 requiring runtime applications 109. In such an embodiment touch application 103 may be executed on CPU 101 to perform these detection and analysis tasks using touch data received from touch controller 124 that senses the location and/or force magnitude of a user's touch on the touchscreen 110. However, it is alternatively possible that methodology 200 may be executed in part, or in whole, by other logic (e.g., software and/or firmware) executing on one or more other programmable integrated circuits of information handing system 100 (e.g., such as touch controller 124 and/or EC 125).

Figure 6:
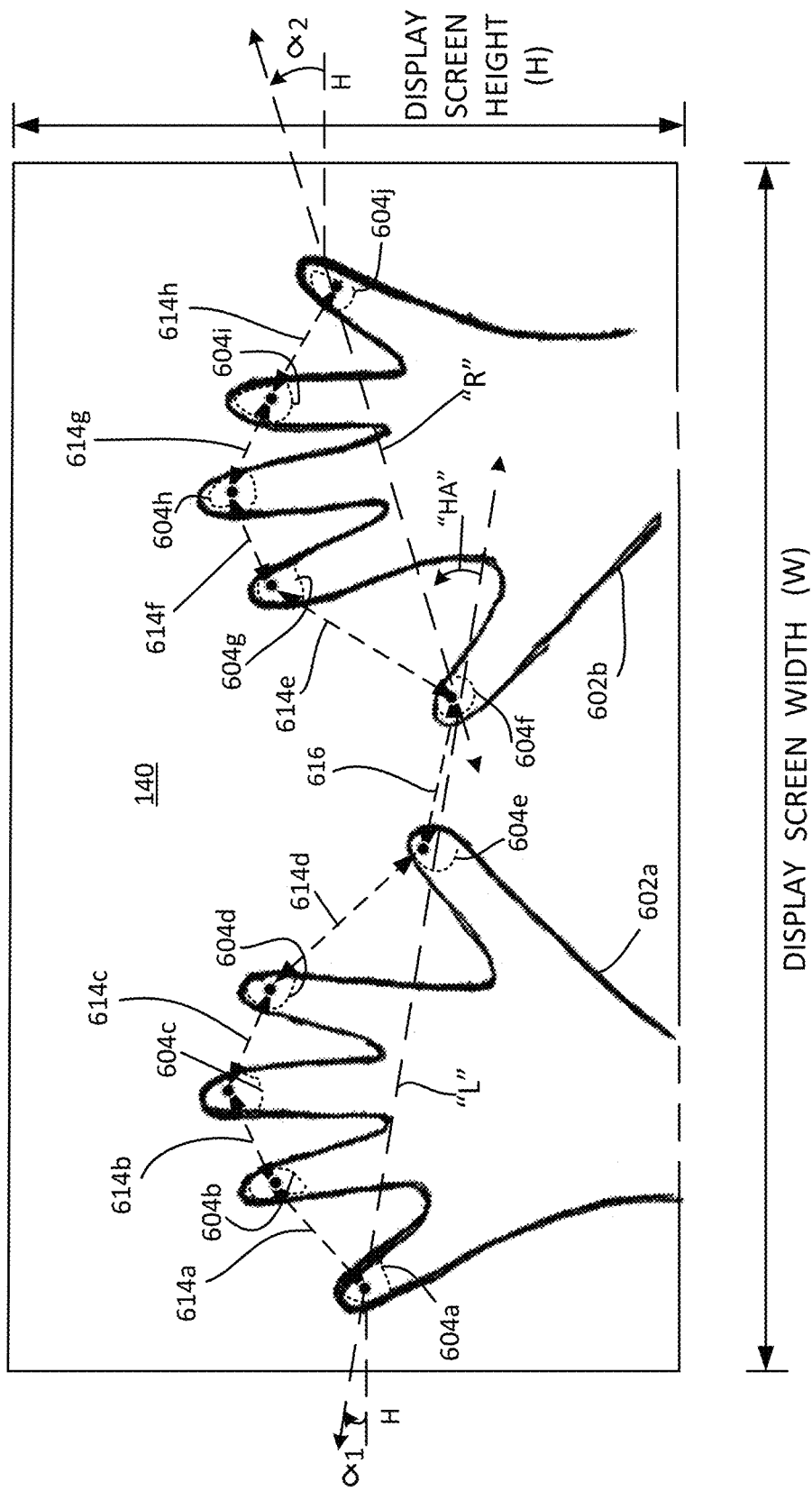
FIG. 6 illustrates a touchscreen according to one exemplary embodiment of the disclosed systems and methods.

As shown in FIG. 2A, methodology 200 begins in step 202 when a user first places one or more fingers in contact with the area of touch-sensing circuitry 140 of touchscreen display 110 at corresponding separate finger (including thumb) touch points 604 as shown in dashed outline in FIG. 6. In one embodiment, step 202 may be executed by touch application 103 as a routine that runs immediately after booting system 100, immediately upon loading a given foreground user application 105, and/or upon a user command received via a current displayed keyboard or keypad displayed on active display area 120 of touchscreen 110, via an icon displayed on touchscreen 110, etc.

In step 202, the occurrence and characteristics of touch points 604 of step 202 are sensed by touch-sensing circuitry 140 and provided as touch point signals (e.g., detected touch point location and magnitude of directly-sensed actual force applied at each touch point location 604) to touch controller 124 and relayed as corresponding data to touch application 103 executing in the background on CPU 101.

In step 204, touch application 103 detects the occurrence of touch points 604 when it receives the touch point data from touch-sensing circuitry 140. In step 206, touch application 103 obtains information regarding characteristics of the current touch points 604 from the touch point data received from touch-sensing circuitry 140 and touch controller 124. This information may include location information (e.g., X, Y coordinate position, etc.) of each different touch point 604 on the area of touch-sensing circuitry 140, touch point density of each touch point (e.g., touch coverage measured as the surface area of each individual touch point), and the directly-sensed magnitude of actual force applied at each touch point 604. In step 206, the touch application 103 may also be programmed to analyze the touch point location information to determine whether fingers of only one user hand 602a or 602b are contacting the touchscreen display 110 (e.g., where only five or less than five touch points are detected), or where both left and right user hands 602a and 602b are contacting the touchscreen display 110 (e.g., respective separate left and right groups of five touch points are detected adjacent to each other on touchscreen display 110).

Next, in step 208, if any keyboard and/or keypad types have been previously specified (e.g., pre-defined on storage 106 by a user or by a system manufacturer or assembler at the factory) for use with one or more type/s of applications 109, methodology proceeds to step 210. In step 210 background-executing touch application 103 may obtain the identity of any application 105 currently executing in the foreground on CPU 101, and in step 212 may determine the type of this foreground-executing application 105. Examples of such application/s 105 include, but are not limited to, a text-input based application such as a word processing application (e.g., Microsoft Word), a numeric-input based application such as a spreadsheet application (e.g., Microsoft Excel), a graphics application (e.g., Adobe Photoshop, etc.), etc.

If a current foreground-executing application 105 is an application having an existing pre-defined custom keyboard or keypad configuration (e.g., configuration stored by user on storage 106), then methodology 200 proceeds from step 212 to step 217 and displays a specified type of keyboard or keypad and/or identity of specified keyboard or keypad keys (e.g., custom selected subset (reduced number) of all text or numeric keyboard or keypad keys and/or custom selected layout (e.g., displayed sequence) of the keyboard or keypad keys) according to the pre-defined custom keyboard or keypad configuration. One example of a displayed reduced subset of QWERTY keyboard keys is display of only the alphabet keys without number keys, and one example of a displayed custom selected layout of QWERTY keyboard keys is display of the QWERTY home row "F" and "J" keys adjacent to each other and display of the "G" and "H" keys on opposing ends of the QWERTY home row keys. In one embodiment, a specific user-customized keyboard or keypad may be specified and pre-defined by a user for a given application and saved (e.g., on system storage 106) for future automatic display when that given application is executing in the foreground (e.g., one or more Canvas Palettes for Dell Canvas available from Dell Technologies, Inc. of Round Rock, Tex.). Methodology 200 may then proceed to step 226, which is described further below.

Figure 8:
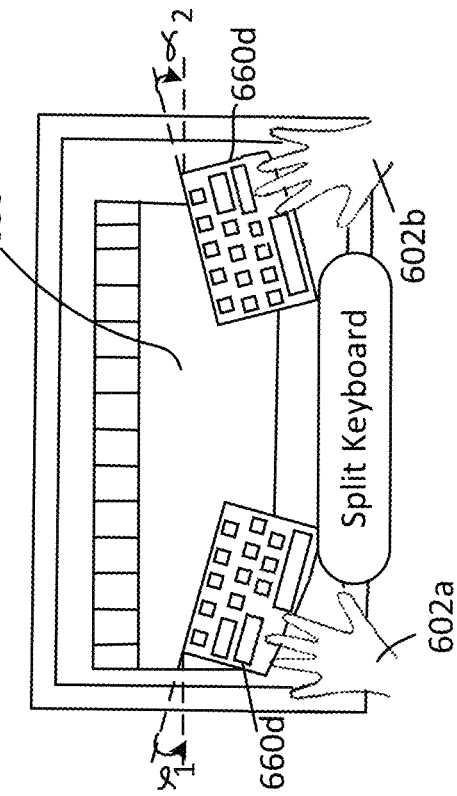
FIG. 8 illustrates an onscreen touch keypad displayed on a touchscreen according to one exemplary embodiment of the disclosed systems and methods.

Still referring to FIG. 2A, if a current foreground-executing application 105 is a numeric input-based application (e.g., such as Microsoft Excel or other spreadsheet application 850), then methodology 200 proceeds from step 212 to step 218 and displays a numeric keypad 660c aligned for user input as shown in FIG. 8 (e.g., with the top row of keypad keys aligned with the determined locations of finger touch points 604 of a user's hand 602 as shown in FIG. 8). Where fingers of only one user hand 602 is contacting the touch-sensing circuitry 140 of touchscreen display 110, the numeric keypad is displayed under the touch points of the one user hand. Where fingers of both the user's hands are contacting the touch-sensing circuitry 140 of touchscreen display 110, then the numeric keypad may be displayed under the touch points of a selected one of the user's hands (e.g., as per pre-defined user configuration stored on storage 106 or by default left or right hand selection set at the factory). Methodology 200 may then proceed to step 226, which is described further below.

If a current foreground-executing application 105 is a text input-based application (e.g., Microsoft Word or other word processing application 650), then methodology 200 moves from step 212 to step 214 where the number of current touch points 604 on touchscreen 110 is determined. If the number of current touch points 604 is found to be greater than five (e.g., 10 detected touch points for two hands 602a and 602b), then a two-handed keyboard (i.e., having keys displayed for touch actuation by both of user hands 602a and 602b) will be displayed, and methodology 200 moves to step 222.

In step 222, the separation distance 616 between detected left and right user hands 602a and 602b is measured as shown in FIG. 6, e.g., with detected hands 602a and 602b being identified as corresponding to respective separate left and right groups of five touch points as previously described, and separation distance being measured between the centroid of the rightmost (left thumb) touch point 604e of the left hand group of five touch points and the centroid of the leftmost (right thumb) touch point 604f of the right hand group of five touch points. Also in step 222, this measured distance between left and right user hands is compared to a pre-defined hand separation threshold value (HT) that may be stored on storage 106. The predefined value of HT may be defined and stored ahead of time (e.g., by a user, system manufacturer or assembler) based on factors such as empirical data collected from actual user trials measuring actual separation distance between multiple users' left and right hands when the users desire a split touch keyboard configuration rather than a single unitary keyboard.

Figure 9:
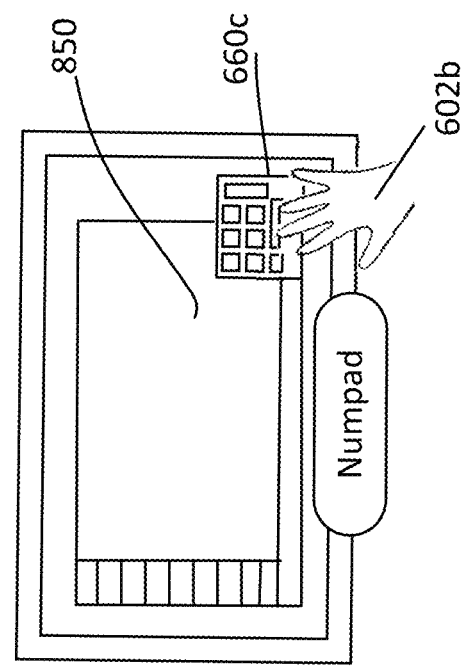
FIG. 9 illustrates an split onscreen touch keyboard displayed according to one exemplary embodiment of the disclosed systems and methods.

If in step 222 the measured distance between left and right user hands is determined to be greater or equal to HT, then step 222 proceeds to step 224, where a split keyboard 602b (e.g., split QWERTY or Dvorak keyboard or other type of split text keyboard) is selected for display as shown in FIG. 9 and methodology 200 proceeds to step 226 described below. As will be further described in relation to the embodiment of FIG. 3, the separate halves of a split keyboard 660d displayed in step 224 may be optionally angled with respect to each other to create an ergonomic split keyboard by matching the detected orientation of user hands 602a and 602b on touchscreen 110. However, if the measured distance between left and right user hands is determined to be less than HT in step 222, then methodology 220 proceeds to step 225, where a single unitary full touch keyboard 660 (e.g., unitary full QWERTY or Dvorak keyboard or other type of unitary full text keyboard) is selected for display. Methodology 200 may end at one of steps 224 or 225 in one embodiment, or may proceed in another embodiment to optional steps 226-238 in a further embodiment.

In one embodiment, methodology 200 may next proceed to optional steps 226-238 where an average measured touch point separation (ATPS) is determined for the touch point locations of the current user, and compared to predefined separation threshold distance values (e.g., T1, T2, T3) stored on storage 106 to determine the size of on-screen touch keyboard or keypad to display on touchscreen 110. ATPS may be calculated, for example, as one of a median, mean or mode of the separation between touch point locations. Optimum values of T1, T2 and T3 may be determined, for example, based on empirical measurement (e.g., user trials in which values of T1, T2, T3 are varied and user satisfaction with the resulting different sizes of displayed on-screen touch keyboards for different sized hands is measured and ranked).

In a further embodiment, a user may be requested (e.g., by touch application 103) to place all ten fingers on the touchscreen display 110 for normal keyboard typing, and the distances between the touch points of each of the user's ten finger may be measured and stored as unique finger spacing value/s, e.g., on non-volatile storage 106 or other system non-volatile memory. These unique measured finger spacing distances may be utilized to display and store on non-volatile memory a custom keyboard that fits each user's hands/fingers, e.g., rather than default small, medium or large keyboard that may be selected based on ATPS that is measured and compared to predefined separation threshold distance values (e.g., T1, T2, T3). Additionally, it is further possible that multiple users may each be allowed to create a different respective custom keyboard corresponding to the measured unique finger spacing distances between each user's touch points, in which case the identity of a current user may be detected based on the stored unique measured finger spacing and used to select and display the corresponding custom keyboard stored for the individual user, and in doing so account for multi-user scenarios.

In one embodiment, touch point separation 614 may be measured between each two adjacent touch points 604 as the straight-line distance between the centroids (i.e., geometric center) of each of two adjacent touch points 604 as shown in FIG. 6, e.g., touch point separation 614a is the measured distance between respective centroids of touch points 604a and 604b of left hand 602a, touch point separation 614b is the measured distance between respective centroids of touch points 604b and 604c of left hand 602a, touch point separation 614e is the measured distance between respective centroids of touch points 604f and 604g of right hand 602b, touch point separation 614f is the measured distance between respective centroids of touch points 604g and 604h of right hand 602b, etc.

In the case of a unitary full size keyboard embodiment of step 225 or a split keyboard embodiment of step 226, the current ATPS may be calculated for the current touch points 614 of both right and left hands 602a and 602b of FIG. 6 by averaging the values of the eight current determined touch point separation distances 614a, 614b, 614c, 614d, 614e, 614f, 614g and 614h of FIG. 6. This calculated current ATPS may be compared in step 226 to a pre-defined first lower touch point separation threshold value (T1) that may be stored, for example, on storage 106. If the current calculated ATPS is found less than T1 in step 226, then a relatively small keyboard size version of the full keyboard of step 225 or split keyboard of step 224 is displayed (having relatively small individual keys) in step 228 on touchscreen 110 (see keyboard 660b of FIG. 7B as an example). However, if the current calculated ATPS is found greater than or equal to T1 in step 228, then methodology 200 proceeds from step 226 to step 230.

In step 230, the current calculated current ATPS may be further compared to a pre-defined second and higher touch point separation threshold value (T2) that may be similarly stored on storage 106 like T1. If the current calculated ATPS is found less than T2 in step 230, then a medium size version (e.g., larger in height and width and having larger keys than the small size version of keyboard of step 228) of the full keyboard of step 225 or split keyboard of step 224 is displayed in step 232 on touchscreen 110. However, if the current calculated ATPS is found greater than or equal to T2 in step 230, then methodology 200 proceeds from step 230 to step 234.

In step 234, the current calculated current ATPS may be further compared to a pre-defined third and highest touch point separation threshold value (T3) that may be similarly stored on storage 106 like T1 and T2. If the current calculated ATPS is found less than T3 in step 234, then a large size version (e.g., (e.g., larger in height and width and having larger keys than the medium size version of keyboard of step 232) of the full keyboard of step 225 or split keyboard of step 224 is displayed in step 236 on touchscreen 110.

Figure 7A:
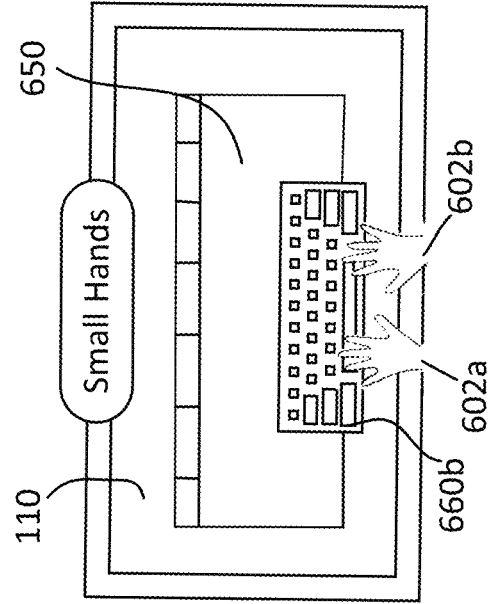
FIG. 7A illustrates a unitary onscreen touch keyboard displayed on a touchscreen according to one exemplary embodiment of the disclosed systems and methods.

However, if the current calculated ATPS is found greater than or equal to T3 in step 230, then methodology 200 proceeds from step 230 to step 238, where an extra-large size version (e.g., larger in height and width and having larger keys than the large size version of keyboard of step 236) of the full keyboard of step 225 or split keyboard of step 224 is displayed on touchscreen 110 (see keyboard 660a of FIG. 7A as an example).

Returning now to step 214, if the number of current touch points 604 is found to be five or less, then a one-handed keyboard (i.e., having keys displayed for touch actuation by only one of user hands 602a or 602b) will be displayed. In one embodiment, methodology may instead proceed directly from step 214 to step 218 without steps 216 and 218. Otherwise, in another embodiment, methodology 200 moves to step 216 where ATPS between the current touch points 604 is determined as previously described, and then compared to a pre-defined touch point separation threshold value (T*) that may be stored, for example, on storage 106. Referring to FIG. 6 as an example, this would be the case where only the five fingers of user hand 602b are placed in contact with touchscreen 110. T* may be pre-defined, for example, by a user, system manufacturer or system assembler, etc. In one embodiment, value of T* may be selected based on user trials.

As described previously, the touch point separation 614 between each of two given adjacent touch points 604 of one hand 602 in step 216 may be measured as the straight-line distance between the centroids of the given two adjacent touch points 604 as shown in FIG. 6, e.g., touch point separation 614e is the measured distance between respective centroids of touch points 604f and 604g of right hand 602b, touch point separation 614f is the measured distance between respective centroids of touch points 604g and 604h of right hand 602b, etc. For right hand 602b of FIG. 6, the ATPS for the current touch points 604 of one hand may be calculated in similar manner as previously described (for both hands 602a and 602b) by averaging the values of the four current determined touch point separation distances 614e, 614f, 614g and 614h. This calculated ATPS may be compared to the pre-defined value of T*.

If the ATPS is found to be below threshold T* in step 216, then methodology 200 moves to step 220 and a "Swipe" keyboard is displayed that allows swipe-like text entry, e.g., as displayed by a modern mobile phone Android OS and by Windows 10 OS. In this regard, the keyboard input functionality is based on a user touching the touchscreen and swiping their finger through all the letters of the displayed keyboard keys to make up a word, instead of tapping each keyboard key for that word. However, if the ATPS is found to be equal or greater than the predefined threshold T* in step 216, then methodology 200 moves to step 218 where a numeric touch keypad 660c (i.e., number pad) is displayed in a manner as previously desired and as shown in FIG. 8. In either case, methodology 200 may proceed in one embodiment to step 226 where the size of the displayed touch keyboard of step 220 or displayed numeric touch keypad of step 218 may then be determined as previously described. However, in an alternate embodiment, methodology 200 may end at one of steps 218 or 220.

Figures 2, 2A:
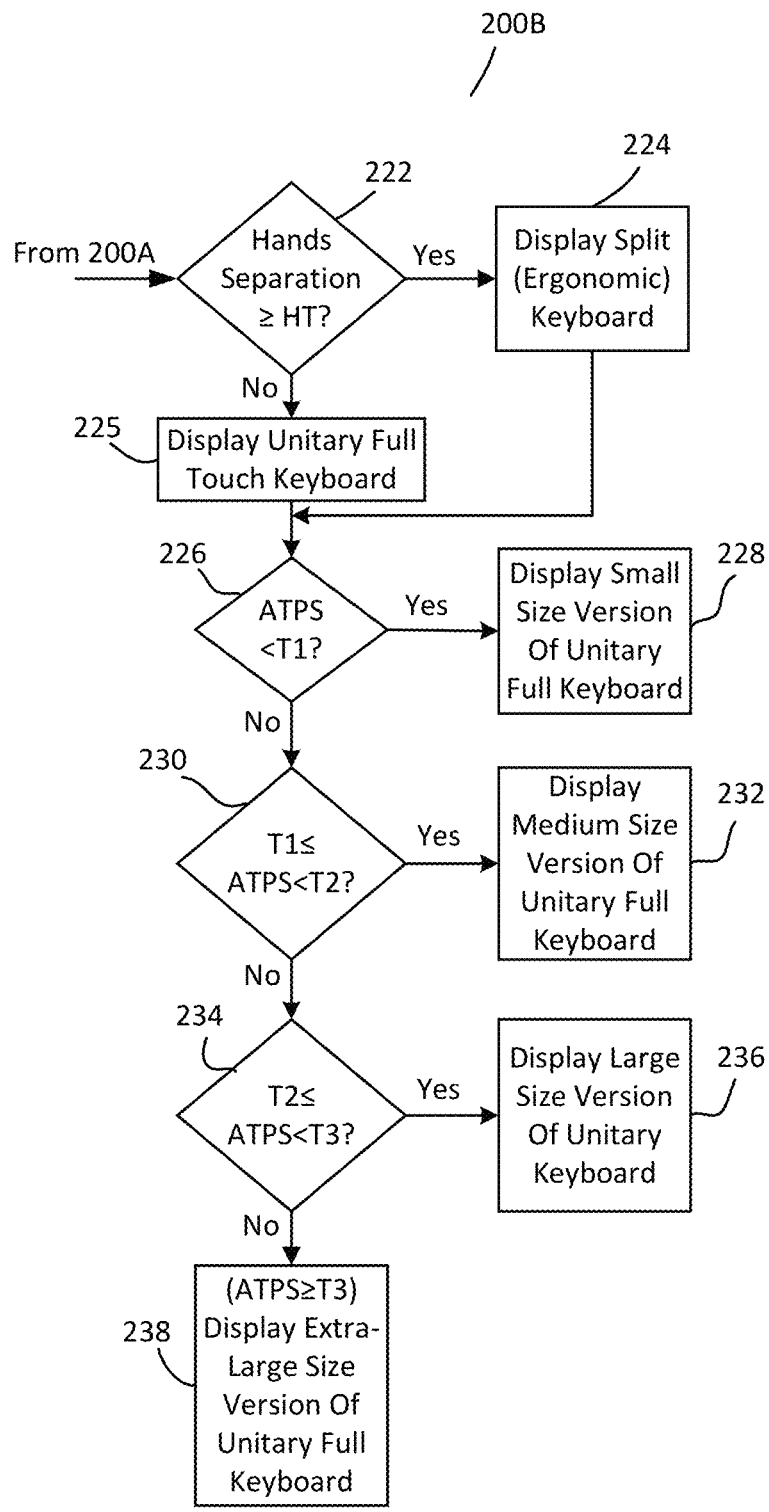
Figure 2B:
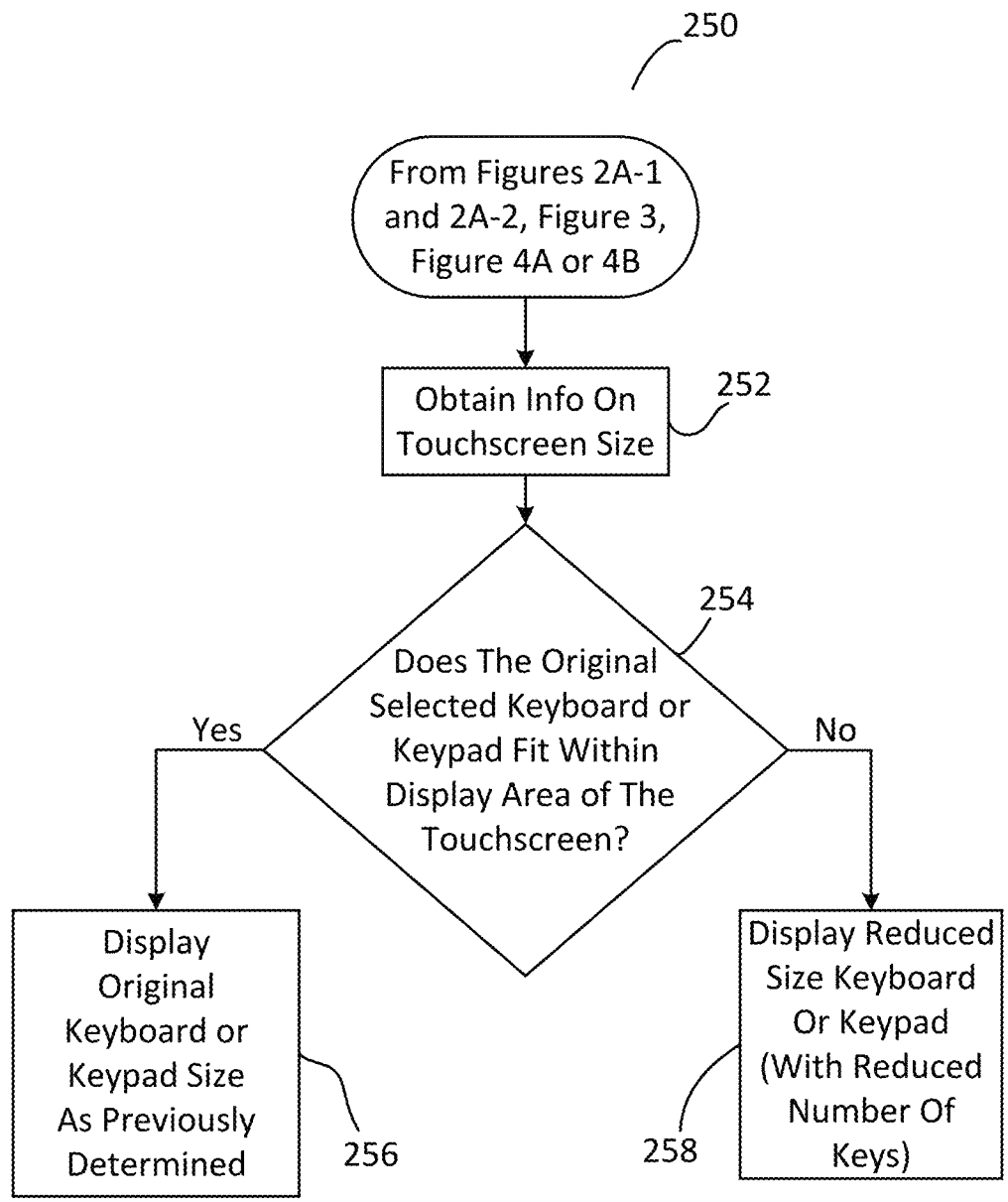
FIG. 2B illustrates methodology according to one exemplary embodiment of the disclosed systems and methods.

FIG. 2B illustrates one embodiment of a methodology 250 that may be optionally employed to adjust the displayed size of an on-screen touch keyboard or touchscreen numeric keypad that has been previously selected according to methodology 200 of FIG. 2A, i.e., to account for actual available active display area 120 of touchscreen display 110. As shown, optional methodology 250 may begin after methodology 200 has been completed with selection of the initial size (e.g., height and width) of an on-screen touch keyboard or touchscreen numeric keypad according to one of steps 228, 232, 236 or 238 as previously described.

Figure 7B:
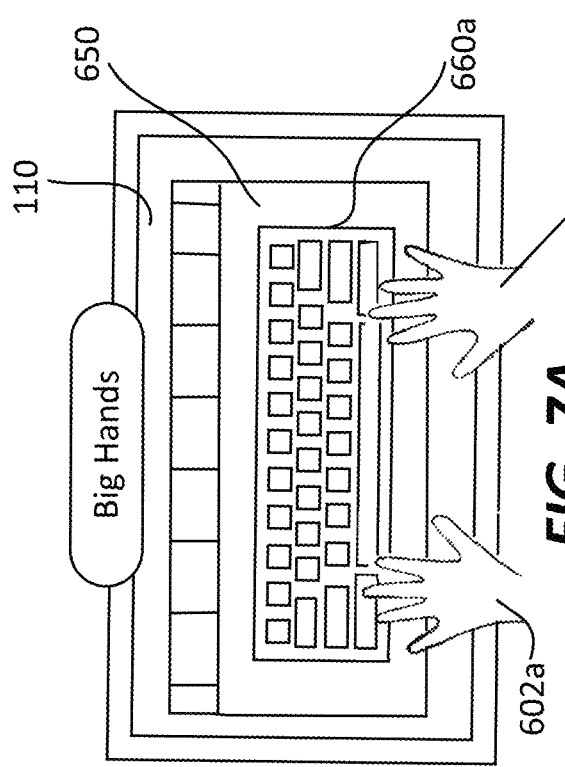
FIG. 7B illustrates a unitary onscreen touch keyboard displayed on a touchscreen according to one exemplary embodiment of the disclosed systems and methods.
Figure 7C:
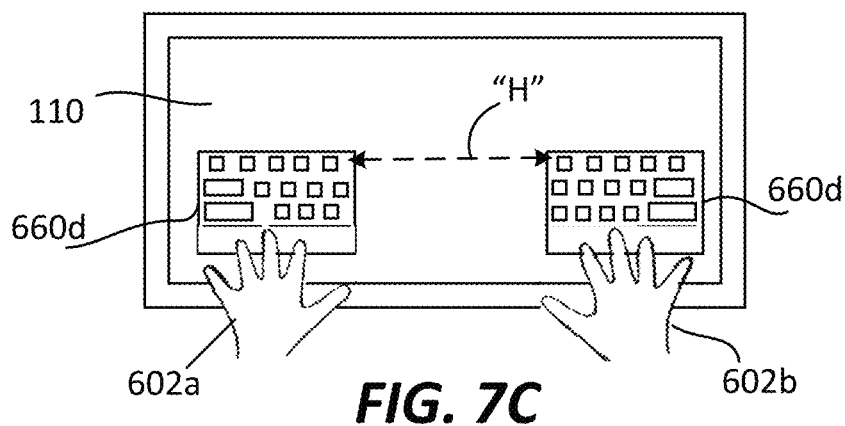
FIG. 7C illustrates a split onscreen touch keyboard displayed on a touchscreen according to one exemplary embodiment of the disclosed systems and methods.
Figure 7D:
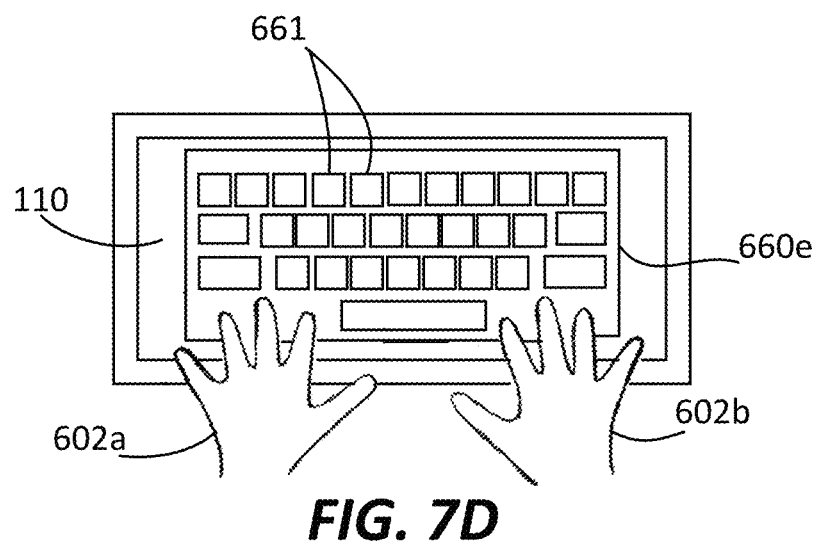
FIG. 7D illustrates an onscreen touch keyboard displayed with larger keys on a touchscreen according to one exemplary embodiment of the disclosed systems and methods.
Figure 7E:
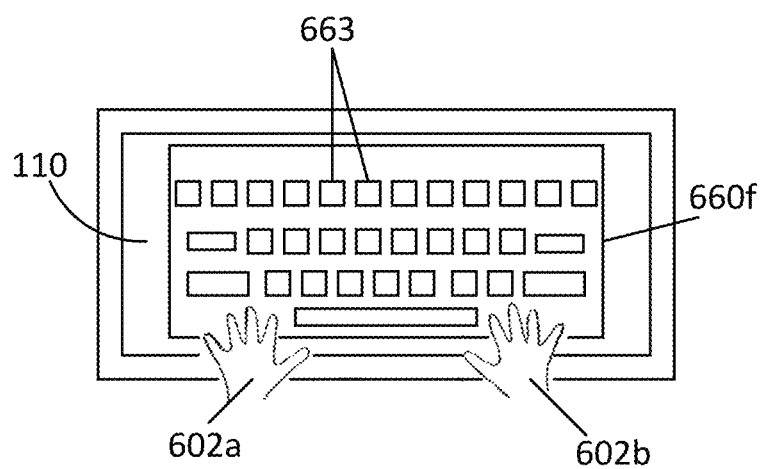
FIG. 7E illustrates an onscreen touch keyboard displayed with smaller keys on a touchscreen according to one exemplary embodiment of the disclosed systems and methods.
Figure 7F:
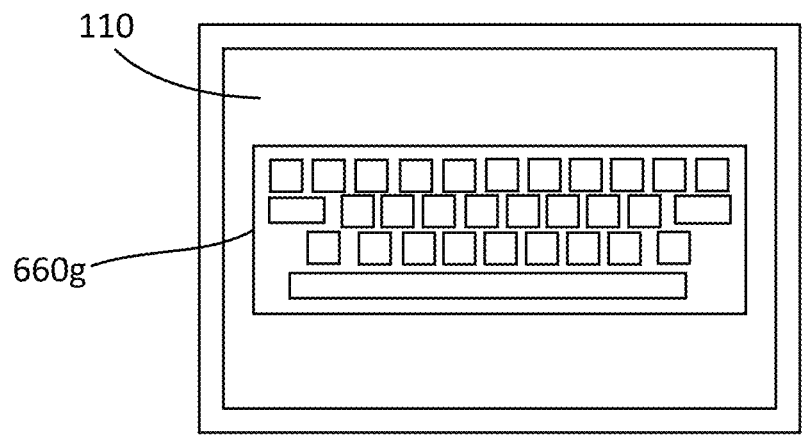
FIG. 7F illustrates a full function onscreen touch keyboard displayed on a touchscreen according to one exemplary embodiment of the disclosed systems and methods.

Methodology 250 of FIG. 2B starts in step 252 where touch application 103 obtains information defining the size (outer peripheral dimensions) of touchscreen active display area 120 for system 100. This active touchscreen size information may be read by the application service 103 (e.g., from the touch controller 124) and the touchscreen dimensions may be expressed, for example, in units of width and height in display pixels. In step 254, the original outer size dimensions (e.g., height and width) of the selected on-screen touch keyboard or touchscreen numeric keypad (e.g., as determined by predefined keyboard or keypad dimensions stored on storage 106, and/or from methodology of FIGS. 2A-1 and 2A-2, and/or FIG. 3 and/or FIG. 4A or 4B described further below) are compared to the size dimensions of touchscreen active display area 120. If the original outer dimensions of the on-screen touch keyboard or touchscreen numeric keypad fit entirely within the dimensions of active display area 120 (e.g., the original keyboard or keypad height is less than or equal to height of active display area 120 of touchscreen display 110 and original keyboard or keypad width is less than or equal to width of active display area 120 of touchscreen display 110), then methodology 200 proceeds to step 256 where the selected on-screen touch keyboard or keypad 660g is displayed with its original size and original number of keys as shown in FIG. 7F.

Figure 7G:
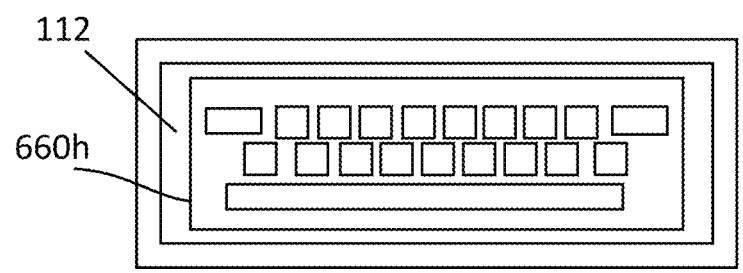
FIG. 7G illustrates a reduced function onscreen touch keyboard displayed on a touchscreen according to one exemplary embodiment of the disclosed systems and methods.

However, if it is determined in step 254 that the original outer size dimensions of the selected on-screen touch keyboard or touchscreen numeric keypad do not fit entirely within the active size dimensions of active display area 120 of touchscreen display 110 (e.g., original keyboard or keypad height is greater than height of active display area 120 of touchscreen display 110 and/or original keyboard or keypad width is greater than width of active display area 120 of touchscreen display 110), then methodology 200 proceeds to step 258 where the outer size dimensions (e.g., height and/or width) of the selected on-screen touch keyboard or keypad are reduced as appropriate to result in a new keyboard or keypad size that fits entirely within the active display area 120 of touchscreen display 110 by reducing an appropriate number of keys displayed within the keyboard or keypad 660h to a subset of the original set of keyboard or keypad keys as shown in FIG. 7G. For example, the displayed subset of keys may include only those keys that are identified as more frequently-used. In this way, less frequently-used keys (e.g., such as page up key, page down key, etc.) may be omitted from the on-screen display so as to leave increased room on the hardware display for displaying the more frequently-used keys (e.g., such as displaying only QWERTY or Dvorak keyboard alphabet keys). To implement step 254, it is possible that the identity of either the more frequently-used keys and/or less-frequently-used keys may be pre-defined and stored in advance by the manufacturer of the information handling system and/or by the user of the information handling system.

Figure 3:
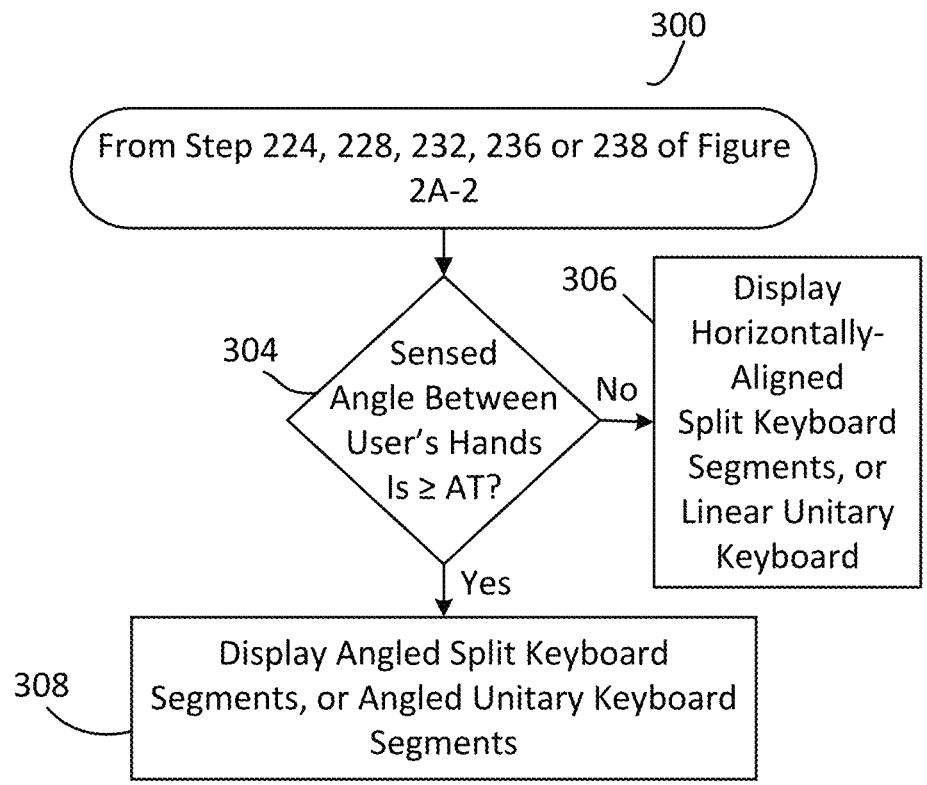
FIG. 3 illustrates methodology according to one exemplary embodiment of the disclosed systems and methods.

FIG. 3 illustrates one embodiment of a methodology 300 that may be optionally employed to selectively display angled separate left and right keyboard segments 660d of a split keyboard selected in step 224 of FIG. 2, an example of which is illustrated in FIG. 9 where each of left and right keyboard segments 660d is separately angled inward at an angle α relative to the horizontal (or relative to the touchscreen longitudinal axis) as shown. Methodology 300 may also be optionally employed to determine to display a unitary (non-split) keyboard of steps 228, 232, 236 or 238 with angled keyboard sections, e.g., such as in a manner similar to a "Wave" keyboard. One exemplary embodiment of such an angled displayed unitary keyboard 670 is illustrated in FIG. 12, where the key rows of each of left and right half sections 1202*a* and 1202*b* of the unitary keyboard 670 is separately angled inward at respective angles $\alpha_1$ and $\alpha_2$ relative to the horizontal (or relative to the touchscreen longitudinal axis) as shown.

Methodology 300 begins in step 304 where magnitude and direction of any current angle between positions of user's left hand 602*a* and right hand 602*b* is determined. Determination of this current angle between hands 602*a* and 602*b* may be made in any suitable manner. For example, in one embodiment the current angle between hands 602*a* and 602*b* of FIG. 6 may be determined by drawing a straight line "L" between centroid of left hand little finger touch point 604*a* and centroid of left hand thumb touch point 604*e*, and drawing a straight line "R" between centroid of right hand thumb touch point 604*f* and right hand little finger touch point 604*j*. The angle ("HA") between line "L" and line "R" may then be calculated as shown in FIG. 6, and the angle between hands 602*a* and 602*b* may then be determined to be the same as this calculated angle HA. Lines "L" and "R" form respective angles $\alpha_1$ and $\alpha_2$ to the horizontal axis of the touchscreen display 110 as shown in FIG. 6.

The determined angle of step 304 may also be compared to a predefined angle threshold (AT) in step 304 to determine if the current angle meets or exceeds the AT. Such an AT may be predefined by a user, system manufacturer or system assembler, and stored on storage 106. If the current angle between the user's hands is found to be less than AT in step 304, then split left and right keyboard segments 660*d* are displayed in horizontally-aligned position in step 306 as shown by dashed horizontal line "H" in FIG. 7C, or a single unitary keyboard is displayed as a linear (non-angled) unitary keyboard with all keys displayed in one or more rows of horizontally-aligned keys such as illustrated in FIGS. 7A and 7B. Determination of whether to display a single unitary keyboard or a split keyboard may have been previously made, for example, during steps 222 and 224 or 225 as previously described, or may be otherwise predefined in any other suitable manner such as a selection stored on storage 106.

Figure 12:
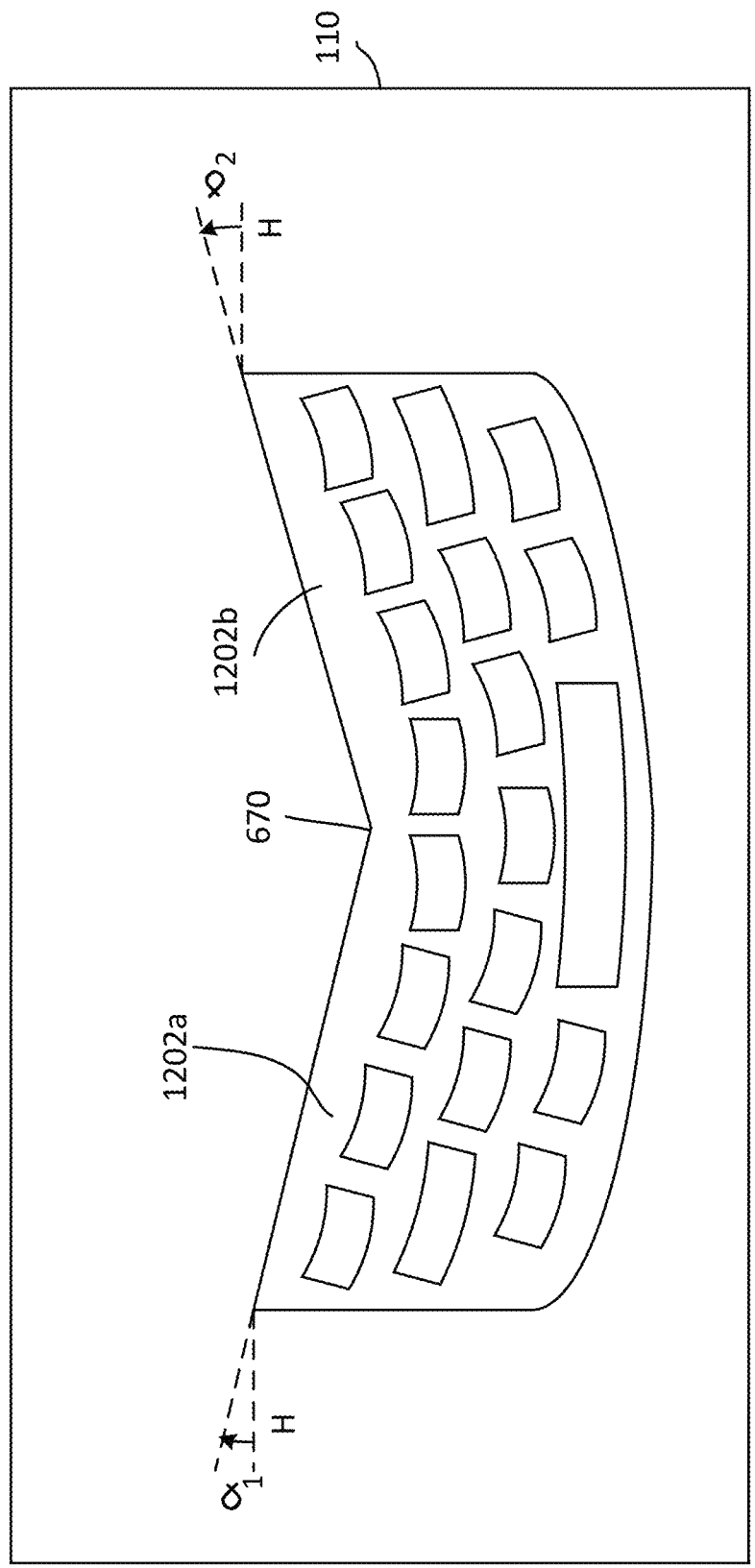
FIG. 12 illustrates a unitary onscreen touch keyboard displayed on a touchscreen according to one exemplary embodiment of the disclosed systems and methods.

Still referring to FIG. 3, if a determined current angle between the user's hands is found in step 304 to meet or exceed the predefined AT, then the key rows of split left and right keyboard segments 660*d* are displayed in angled relationship relative to each other (according to the determined angle of step 304) in step 308, or separate left and right half sections 1202*a* and 1202*b* of a unitary keyboard 670 are displayed as being separately angled relative to each other (according to the determined angle of step 304) as shown in FIG. 12. Determination of whether to display a single unitary keyboard or a split keyboard may have been previously made, for example, during steps 222 and 224 or 225 as previously described, or may be otherwise predefined in any other suitable manner such as a selection stored on storage 106.

Left and right keyboard segments 660*d* of FIG. 9 (and left and right keyboard sections 1202*a* and 1202*b*) are shown displayed with their upper keyboard sides and key rows angled inward toward each other in response to a determined inward-angled relationship between the user's left and right hands 602*a* and 602*b*. However, left and right keyboard segments 660*d* (and left and right keyboard sections 1202*a* and 1202*b*) may also be displayed with their upper keyboard sides and key rows angled outward away from each other in response to a determined outward-angled relationship between the user's left and right hands 602*a* and 602*b*. In one embodiment, the direction and magnitude of the displayed angle of left and right keyboard segments 660*d* and their key rows (as well as left and right keyboard sections 1202*a* and 1202*b* of FIG. 12 and their key rows) may be selected to match the actual measured angle of the user's left and right hands 602*a* and 602*b* (e.g., lines "L" and "R") to the horizontal axis of the touchscreen display 110, respectively. In such an embodiment, the horizontal axes (e.g., keyboard key row axes) of each of left and right keyboard segments 660*d* may be displayed at separate angles to the horizontal axis of the active display area 120 of touchscreen display 110 that match the angles $\alpha_1$ and $\alpha_2$ of respective lines "L" and "R" to the horizontal axis of the active display area 120 of touchscreen display 110, as shown in FIGS. 9 and 12.

However, in another embodiment, left and right keyboard segments 660*d* and their key rows (and left and right keyboard sections 1202*a* and 1202*b* and their key rows) may be displayed in step 308 at a default inward angle or outward angle as the case may be. Such default angle values may be predefined by user/manufacturer/assembler and stored, for example, on storage 106.

Figure 4A:
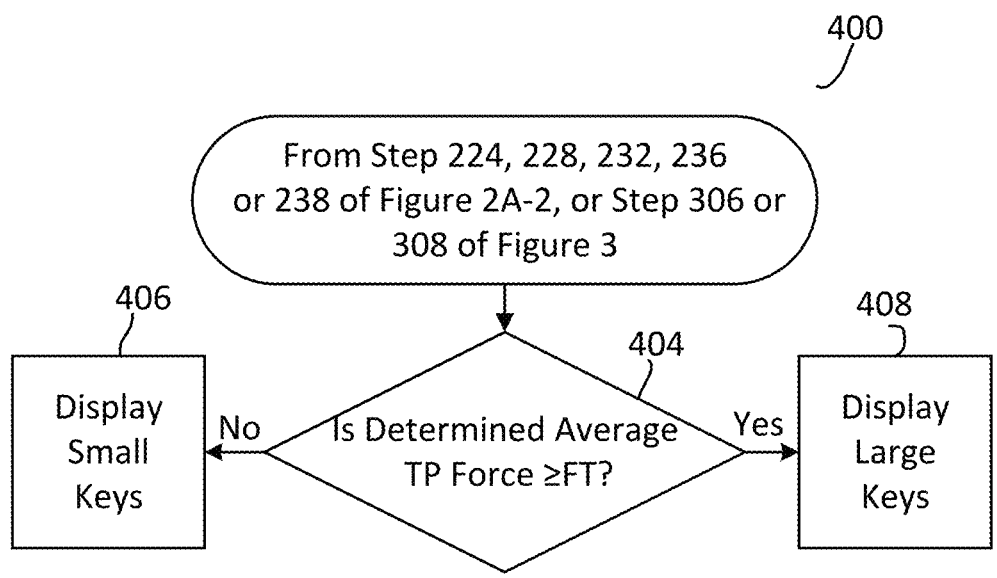
FIG. 4A illustrates methodology according to one exemplary embodiment of the disclosed systems and methods.

FIG. 4A illustrates methodology 400 that may be implemented in one exemplary embodiment to determine displayed key size for a displayed touch keyboard or touch keypad based on sensed magnitude of force applied by the fingers (including thumb/s) of a user hand/s 602 at touchpoints 604 on a touchscreen display 110. As shown, methodology 400 may be applied to on-screen touch keyboard configurations that have been selected, for example, by the steps of methodology 200 or methodology 300 of respective FIG. 2A or 3.

In FIG. 4A, methodology 400 begins in step 404 where the directly-sensed magnitude of force or force actually applied to all the different touchpoints 604 by a user's fingers on touchscreen 110 (e.g., as illustrated in FIG. 6) is averaged and compared to a pre-defined force magnitude threshold (FT) value which may be configured and stored, for example, on storage 106 by a user, system manufacturer or system assembler. The average applied touchpoint force value used in step 404 may be calculated by averaging together the directly-sensed values of force that are actually applied to the different respective individual touchpoints 604 by a user's fingers on touchscreen 110 at the time of execution of the methodology 200 or methodology 300 of respective FIG. 2A or 3 to select a type of touch keyboard or touch keypad for display on touchscreen 110. If this sensed average touchpoint force magnitude is found in step 404 to be equal to or greater than the pre-defined FT value, then the currently selected on-screen touch keyboard or keypad is displayed with relatively larger keys in step 408. However, if the sensed average touchpoint force magnitude is found in step 404 to be less than the pre-defined FT value, then the currently selected on-screen touch keyboard or keypad is displayed with relatively smaller keys in step 406.

Figure 4B:
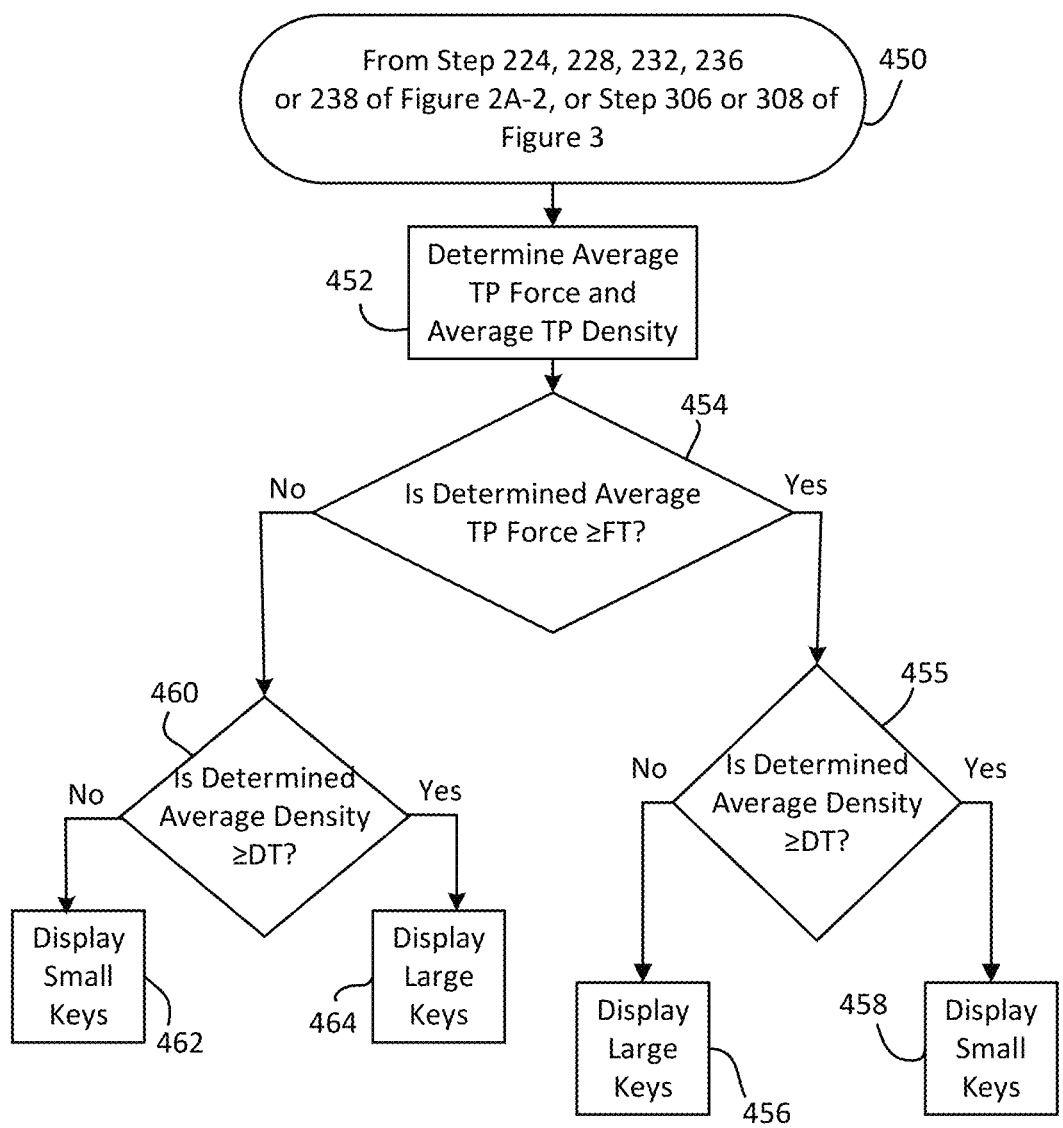
FIG. 4B illustrates methodology according to one exemplary embodiment of the disclosed systems and methods.

FIG. 4B illustrates optional methodology 450 that may be implemented in one exemplary embodiment to determine displayed key size for a displayed touch keyboard or touch keypad based on sensed and determined magnitude of force and touch point density applied by the fingers (including thumb/s) of a user hand/s 602 at touch points 604 on a touchscreen display 110. As shown, methodology 450 may be applied to on-screen touch keyboard configurations that have been selected, for example, by the steps of methodology 200 or methodology 300 of respective FIG. 2A or 3.

In FIG. 4B, methodology 450 begins in step 452 where the directly-sensed magnitude of force actually applied to all the different touch points (TPs) 604 by a user's fingers currently placed in contact with the touchscreen 110 (e.g., as illustrated in FIG. 6) is averaged. The average applied touch point force value used in step 452 may be calculated by averaging together the directly-sensed values of force that are actually applied to the different respective individual touch points 604 by all of the user's fingers on touchscreen 110 at the time of execution of the methodology 200 or methodology 300 of respective FIG. 2A or 3 to select a type of touch keyboard or touch keypad for display on touchscreen 110. Similarly, the sensed touch point density for each of the different individual touch points 604 on touchscreen display 110 may be determined in step 452 at for all of the user's fingers on touchscreen 110 at the time of execution of the methodology 200 or methodology 300 of respective FIG. 2A or 3, i.e., as the measured touch point coverage surface area (e.g., contact surface area) within the dashed outer periphery of each touch point 604 as shown in FIG. 6. These determined density values for all of the user's current touch points 604 may then be averaged in step 452 to determine an average touch point density. It will be understood that average touch point density may be determined using any suitable alternatively method, e.g., by measuring a total surface area value of the entire touch point area currently contacted by the user's fingers, and then dividing this measured total surface area by the current number of user fingers (e.g., ten fingers) contacting the touch screen display 110.

Next in step 454, the average applied touch point force value of step 452 is compared to a pre-defined force magnitude threshold (FT) value which may be configured and stored, for example, on storage 106 by a user, system manufacturer or system assembler. If this sensed average touch point force magnitude is found in step 454 to be equal to or greater than the pre-defined FT value, then methodology 450 proceeds to step 455 where the determined average touch point density of step 452 is compared to a pre-defined density magnitude threshold (DT) value (e.g., predefined contact surface area threshold value) which may be configured and stored, for example, on storage 106 by a user, system manufacturer or system assembler. If this determined average touch point density is found in step 405 to be greater than or equal to the predefined value of DT, then the currently selected on-screen touch keyboard or keypad 660f is displayed with relatively smaller keys 663 in step 458 as shown in FIG. 7E, such as in the case where a user with small or thin fingers is pressing hard on the keys to generate a relatively greater touch point density. Otherwise, if this determined average touch point density is found in step 455 to be less than the predefined value DT, then the currently selected on-screen touch keyboard or keypad 660e is displayed with relatively larger keys 661 in step 458 as shown in FIG. 7D.

If the sensed average touch point force magnitude is found in step 454 to be less than the pre-defined FT value, then methodology 450 proceeds to step 460 where the determined average touch point density of step 452 is compared to the pre-defined DT value. If the determined average touch point density is found in step 405 to be less than the predefined value of DT, then the currently selected on-screen touch keyboard or keypad 660f is displayed with relatively smaller keys 663 in step 462 as shown in FIG. 7E. However, if the determined average touch point density is found in step 405 to be greater than or equal to the predefined value DT, then the currently selected on-screen touch keyboard or keypad 660e is displayed with relatively larger keys 661 in step 464 as shown in FIG. 7D, such as in the case where a user with large or thick fingers is gently pressing or typing on the keys.

Figure 5:
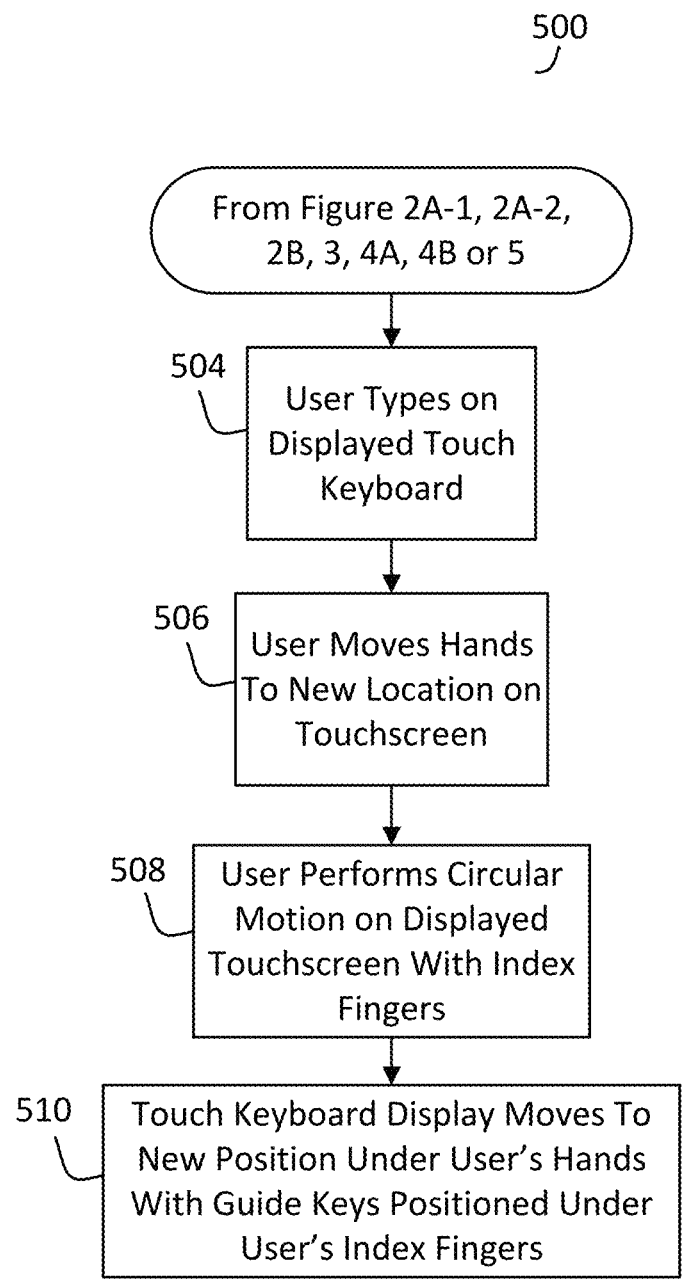
FIG. 5 illustrates methodology according to one exemplary embodiment of the disclosed systems and methods.
Figure 10:
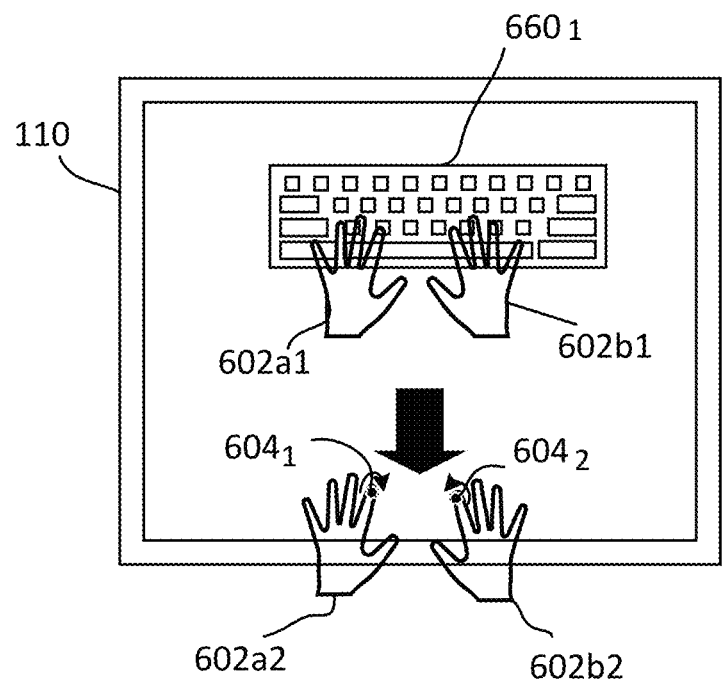
FIG. 10 illustrates an onscreen touch keyboard displayed at a first location on a touchscreen according to one exemplary embodiment of the disclosed systems and methods.
Figure 11:
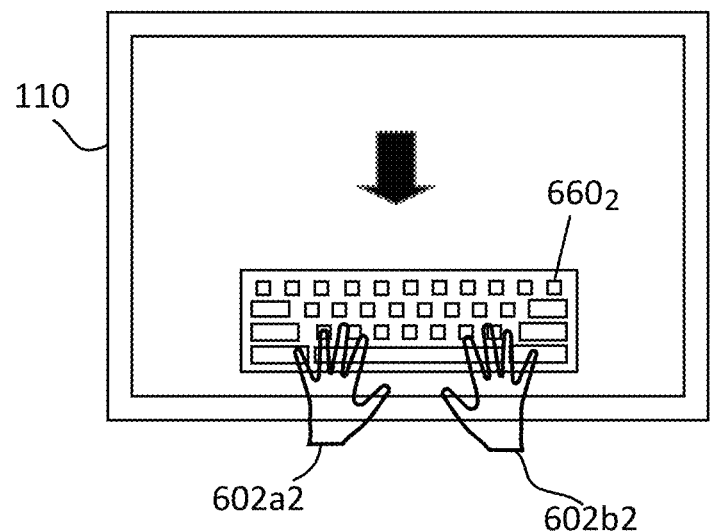
FIG. 11 illustrates an onscreen touch keyboard displayed at a second location on a touchscreen according to one exemplary embodiment of the disclosed systems and methods.

FIG. 5 illustrates optional methodology 500 that may be implemented in one exemplary embodiment to allow a user to reposition any of the selected on-screen touch keyboards or keypads of FIG. 2A, 2B, 3, 4, or 5. As shown, methodology 500 begins in step 504 with a touch keyboard displayed in a first location 6601 and with user's hands positioned (and possibly typing) at locations 602a1 and 602b1 over the displayed touch keyboard 6601 as shown in FIG. 10. In step 506, the user moves their hands to new and different locations 602a2 and 602b2 on touchscreen 110 that are positioned apart from (and not over) touch keyboard 6601 as shown by the arrow in FIG. 10. In step 508, the user begins using their index fingers to perform a prescribed motion (e.g., clockwise or counterclockwise circular motion, square or rectangular-shaped motion, cross ("X") shaped motion, etc.) at each of index finger touch points $604_1$ and $604_2$ while maintaining contact of the index finger tips with touchscreen 110, e.g., as shown in FIG. 10 by the exemplary circular arrows.

In response to detection of this simultaneous two-finger circular motion in step 510 (e.g., by touch application 103), the displayed position of the touch keyboard is moved to the new location $660_2$ which is positioned under the new hand locations 602a2 and 602b2 on touchscreen 110. Motion of touch keyboard 660 to its new location may or may not be shown (e.g., animated) to the user on the active display area 120 of touchscreen display 110, e.g., it be an abrupt rendering of touch keyboard at the new location $660_2$. In an embodiment where the displayed keyboard $660_2$ is a QWERTY keyboard, the touch keyboard may be re-positioned and rendered at a new location $660_2$ in which the QWERTY home row guide keys "F" and "J" are displayed in respective new positions directly beneath the users right index finger $604_2$ and left index finger $604_1$, i.e., so that the user's hands 602a2 and 602b2 are correctly positioned to begin typing on touch keyboard $660_2$. Although FIG. 10 illustrates re-positioning of a full text keyboard to a new location beneath a user's two index fingers that are preforming the prescribed motion, in other embodiments a numeric keypad and/or a single split keyboard segment may be similarly repositioned to a new location beneath a user's single finger that is preforming a prescribed motion.

It will be understood that the steps of methodologies 200, 250, 300 and 500 are exemplary only, and that any other step order and/or combination of fewer, additional and/or alternative steps may be employed that is suitable for selecting and/or displaying onscreen touch keyboards and onscreen touch keypads. For example, the methodology of any one of FIG. 2A-1, 2A-2, 2B, 3, 4, or 5 may be practiced independently, or the methodology of any one of FIG. 2A-1, 2A-2, 2B, 3, 4, or 5 may be practiced in combination with the methodology of any selected one or more of the of FIG. 2A-1, 2A-2, 2B, 3, 4, or 5, to select and/or display onscreen touch keyboards and/or onscreen touch keypads. Furthermore, the associated methodology of any of steps 210-212, (application type determination), 214 (number of touch points determination), 216 (touch point separation determination), 222 (hands separation determination), 216/230/234 (ATPS determination), 252-254 (touchscreen display size determination), 304 (hand angle determination), 404 (touch force determination), and 506-510 (keyboard movement)

may be practiced individually or any combination with any one or more other of these groups of steps to select and/or display onscreen touch keyboards and onscreen touch keypads.

It will also be understood that one or more of the tasks, functions, or methodologies described herein (e.g., including those described herein for components 101, 108, 109, 124, 125, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising performing the following as a routine that executes immediately after booting an information handling system, immediately upon loading a given foreground user application on the information handling system, and/or upon a user command received via a displayed keyboard or keypad currently displayed on an active display area of a touchscreen display of the information handling system:
    sensing a presence and location of each of one or more touch points applied by a user to the touchscreen display of the information handling system, each of the user touch points corresponding to a location of a user finger touching the touchscreen;
    sensing a magnitude of force applied to the touchscreen display at each of the user touch points;
    determining a key size for displaying each of the keys of a selected keyboard or keypad having multiple keyboard keys based on the sensed magnitude of force; and
    displaying the selected keyboard or keypad on the touchscreen display with all of the multiple keyboard keys of the displayed selected keyboard or keypad having the key size that has been determined based on the sensed magnitude of force.

2. The method of claim 1, further comprising:
    receiving and saving at least one user-specified pre-defined keyboard or keypad configuration to be displayed when executing a given foreground user application;
    executing a foreground user application on a processing device of the information handling system;
    determining an identity of the executing foreground user application; and
    automatically selecting and retrieving a type of the displayed keyboard or keypad and/or an identity and/or layout of individual keys of the displayed keyboard or keypad from the at least one saved user-specified pre-defined keyboard or keypad configuration based on the determined identity of the executing foreground application.

3. The method of claim 1, further comprising:
    determining a number of the user touch points applied by the user to the touchscreen display; and
    then displaying the selected keyboard as:
        a two-handed keyboard only if the determined number of sensed user touch points is greater than six; and
        a one-handed keyboard only if the determined number of sensed user touch points is five or less.

4. The method of claim 1, where there are multiple sensed user touch points; and where the method further comprises:

sensing individual locations of each of the multiple sensed user touch points on the touchscreen display;
determining a separation distance between individual touch points of each pair of adjacent sensed user touch points;
determining an average touch point separation (ATPS) by averaging the determined separation distances of each pair of adjacent sensed user touch points; and
selecting a type and/or size of the displayed keyboard or keypad based on the determined ATPS.

5. The method of claim 1, further comprising:
detecting a location of a user's left hand as a group of leftmost touch points and detecting a location of a user's right hand as a group of rightmost touch points;
determining a separation distance between the detected user's left hand and the detected user's right hand; and then:
displaying the selected keyboard as a unitary full text keyboard only if the determined separation distance is less than a predefined hand separation threshold value, and
displaying the selected keyboard as a split text keyboard only if the determined separation distance is greater than or equal to the predefined hand separation threshold value.

6. The method of claim 1, further comprising:
selecting original keyboard keys and keyboard or keypad size dimensions to display;
determining outer size dimensions of an active display area of the touchscreen display;
determining if the selected original keyboard or keypad keys and keyboard or keypad size dimensions fit entirely within the outer size dimensions of the display area of the touchscreen display; and then:
displaying the keyboard or keypad with the selected original keys and keyboard or keypad size dimensions on the touchscreen display only if it is determined that the selected original keyboard or keypad keys and keyboard or keypad size dimensions fit entirely within the outer size dimensions of the display area of the touchscreen display, and
displaying a reduced size keyboard or keypad with a reduced number of keys that fits entirely within the outer size dimensions of the display area of the touchscreen display only if it is determined that the selected original keyboard keys and keyboard size dimensions do not fit entirely within the outer size dimensions of the display area of the touchscreen display.

7. The method of claim 6, where the reduced size keyboard or keypad only includes a defined subset of the selected original keys that are identified as being more frequently-used.

8. The method of claim 1, further comprising:
displaying the selected keyboard or keypad at a first location on the touchscreen display;
detecting a prescribed motion of one or more user fingers in contact with the touchscreen display at one or more second locations that are positioned apart from the displayed keyboard or keypad;
responding to the detected prescribed motion by re-positioning the displayed keyboard to a position on the touchscreen display that is beneath the second location.

9. The method of claim 8, where the selected displayed keyboard or keypad is a QWERTY or Dvorak text keyboard; where the prescribed motion is made simultaneously by a user's left and right index fingers; and where the method further comprises responding to the detected simultaneous prescribed motion of the user's left and right index fingers at the second locations by re-positioning the displayed keyboard to the position on the touchscreen display on the touchscreen display so that the home row guide keys "J" and "F" are automatically displayed in respective new positions on the touchscreen display that are directly beneath the corresponding second locations of the left and right index fingers making the prescribed motion in contact with the touchscreen display.

10. The method of claim 1, further comprising:
determining a touch point density of the user touch points; and
determining a key size based on the sensed magnitude of force and determined touch point density.

11. A method, comprising:
sensing a presence and location of each of one or more touch points applied by a user to a touchscreen display of an information handling system, each of the user touch points corresponding to a location of a user finger touching the touchscreen;
sensing a magnitude of force applied to the touchscreen display at each of the user touch points;
determining a key size based on the sensed magnitude of force; and
displaying a selected keyboard or keypad having multiple keyboard keys of the determined key size on the touchscreen display;
where there are multiple sensed user touch points, and where the method further comprises:
sensing individual locations of each of the multiple sensed user touch points on the touchscreen display,
determining a separation distance between individual touch points of each pair of adjacent sensed user touch points,
determining an average touch point separation (ATPS) by averaging the determined separation distances of each pair of adjacent sensed user touch points, and
selecting a type and/or size of the displayed keyboard or keypad based on the determined ATPS; and
where the selecting comprises comparing the determined ATPS to at least one predefined separation threshold distance value; and then:
displaying the selected keyboard with a first size only if the determined ATPS is greater than or equal to a predefined separation threshold distance value, and
displaying the selected keyboard with a second size that is smaller than the first size only if the determined ATPS is less than the predefined separation threshold distance value.

12. A method, comprising:
sensing a presence and location of each of one or more touch points applied by a user to a touchscreen display of an information handling system, each of the user touch points corresponding to a location of a user finger touching the touchscreen;
sensing a magnitude of force applied to the touchscreen display at each of the user touch points;
determining a key size based on the sensed magnitude of force; and
displaying a selected keyboard or keypad having multiple keyboard keys of the determined key size on the touchscreen display;
detecting a location of a user's left hand as a group of leftmost touch points and detecting a location of a user's right hand as a group of right most touch points;

determining an angle between the detected user's left hand and the detected user's right hand;

only if the determined angle is greater than or equal to a predefined angle threshold, displaying the selected keyboard as either:

a single unitary full text keyboard having left and right hand segments that are angled relative to each other according to the determined angle, or separate left and right split text keyboard segments that are angled relative to each other according to the determined angle; and only if the determined angle is less than the predefined angle threshold, displaying the selected keyboard as either:

a single unitary linear full text keyboard having all keys displayed in one or more rows of horizontally-aligned keys, or separate left and right split text keyboard segments that are horizontally aligned with each other.

13. An information handling system, comprising:

a touchscreen display displaying visual images and generating signals representative of a sensed location and magnitude of force applied to each of one or more touch points by a user to the touchscreen display; and at least one programmable integrated circuit coupled to the touchscreen display, the at least one programmable integrated circuit providing signals generating the visual images on the touch screen display and receiving the signals from the touchscreen display representative of the sensed location and magnitude of force applied to each of the one or more touch points by the user to the touchscreen display;

where the at least one programmable integrated circuit is programmed to perform the following as a routine that executes immediately after booting the information handling system, immediately upon loading a given foreground user application on the information handling system, and/or upon a user command received via a displayed keyboard or keypad currently displayed on an active display area of the touchscreen display of the information handling system:

determine a key size for displaying each of the keys of a selected keyboard or keypad having multiple keyboard keys based on the sensed magnitude of force; and display the selected keyboard or keypad on the touchscreen display with all of the multiple keyboard keys of the displayed selected keyboard or keypad having the key size that has been determined based on the sensed magnitude of force.

14. The information handling system of claim 13, where the at least one programmable integrated circuit is programmed to:

receive and save at least one user-specified pre-defined keyboard or keypad configuration to be displayed when executing a given foreground user application;

execute a foreground user application on a processing device of the information handling system;

determine an identity of the executing foreground user application; and automatically select and retrieve a type of the displayed keyboard or keypad and/or an identity and/or layout of individual keys of the displayed keyboard or keypad from the at least one saved user-specified pre-defined keyboard or keypad configuration based on the determined identity of the executing foreground application.

15. The information handling system of claim 13, where the at least one programmable integrated circuit is programmed to:

determine a number of the user touch points applied by the user to the touchscreen display; and then display the selected keyboard as:

a two-handed keyboard only if the determined number of sensed user touch points is greater than six; and a one-handed keyboard only if the determined number of sensed user touch points is five or less.

16. The information handling system of claim 13, where the one or more touch points comprise multiple touch points; and where the at least one programmable integrated circuit is programmed to:

determine a separation distance between individual touch points of each pair of adjacent sensed user touch points;

determine an average touch point separation (ATPS) by averaging the determined separation distances of each pair of adjacent sensed user touch points; and select a type and/or size of the displayed keyboard or keypad based on the determined ATPS.

17. The information handling system of claim 13, where the at least one programmable integrated circuit is programmed to:

detect a location of a user's left hand as a group of leftmost touch points and detect a location of a user's right hand as a group of rightmost touch points;

determine a separation distance between the detected user's left hand and the detected user's right hand; and then:

display the selected keyboard as a unitary full text keyboard only if the determined separation distance is less than a predefined hand separation threshold value, and display the selected keyboard as a split text keyboard only if the determined separation distance is greater than or equal to the predefined hand separation threshold value.

18. The information handling system of claim 13, where the at least one programmable integrated circuit is programmed to:

select original keyboard keys and keyboard or keypad size dimensions to display;

determine outer size dimensions of an active display area of the touchscreen display;

determine if the selected original keyboard or keypad keys and keyboard or keypad size dimensions fit entirely within the outer size dimensions of the display area of the touchscreen display; and then:

display the keyboard or keypad with the selected original keys and keyboard or keypad size dimensions on the touchscreen display only if it is determined that the selected original keyboard or keypad keys and keyboard or keypad size dimensions fit entirely within the outer size dimensions of the display area of the touchscreen display, and display a reduced size keyboard or keypad with a reduced number of keys that fits entirely within the outer size dimensions of the display area of the touchscreen display only if it is determined that the selected original keyboard keys and keyboard size dimensions do not fit entirely within the outer size dimensions of the display area of the touchscreen display.

19. The information handling system of claim 18, where the reduced size keyboard or keypad only includes a defined subset of the selected original keys that are identified as being more frequently-used.

20. The information handling system of claim 13, where the at least one programmable integrated circuit is programmed to:
display the selected keyboard or keypad at a first location on the touchscreen display;
detect a prescribed motion of one or more user fingers in contact with the touchscreen display at one or more second locations that are positioned apart from the displayed keyboard or keypad;
respond to the detected prescribed motion by re-positioning the displayed keyboard to a position on the touchscreen display that is beneath the second location.

21. The information handling system of claim 20, where the selected displayed keyboard or keypad is a QWERTY or Dvorak text keyboard; where the prescribed motion is made simultaneously by a user's left and right index fingers; and where the at least one programmable integrated circuit is programmed to respond to the detected simultaneous prescribed motion of the user's left and right index fingers at the second locations by re-positioning the displayed keyboard to the position on the touchscreen display on the touchscreen display so that the home row guide keys "J" and "F" are automatically displayed in respective new positions on the touchscreen display that are directly beneath the corresponding second locations of the left and right index fingers making the prescribed motion in contact with the touchscreen display.

22. The information handling system of claim 13, where the at least one programmable integrated circuit is programmed to:
determine a touch point density of the user touch points; and
determine a key size based on the sensed magnitude of force and determined touch point density.

23. An information handling system, comprising:
a touchscreen display displaying visual images and generating signals representative of a sensed location and magnitude of force applied to each of one or more touch points by a user to the touchscreen display; and
at least one programmable integrated circuit coupled to the touchscreen display, the at least one programmable integrated circuit providing signals generating the visual images on the touch screen display and receiving the signals from the touchscreen display representative of the sensed location and magnitude of force applied to each of the one or more touch points by the user to the touchscreen display;
where the at least one programmable integrated circuit is programmed to:
determine a key size based on the sensed magnitude of force; and
display a selected keyboard or keypad having multiple keyboard keys of the determined key size on the touchscreen display;
where the one or more touch points comprise multiple touch points, and where the at least one programmable integrated circuit is programmed to:
determine a separation distance between individual touch points of each pair of adjacent sensed user touch points,
determine an average touch point separation (ATPS) by averaging the determined separation distances of each pair of adjacent sensed user touch points, and
select a type and/or size of the displayed keyboard or keypad based on the determined ATPS; and
where the at least one programmable integrated circuit is programmed to select the type and/or size of the displayed keyboard or keypad by comparing the determined ATPS to at least one predefined separation threshold distance value, and then:
display the selected keyboard with a first size only if the determined ATPS is greater than or equal to a predefined separation threshold distance value, and
display the selected keyboard with a second size that is smaller than the first size only if the determined ATPS is less than the predefined separation threshold distance value.

24. An information handling system, comprising:
a touchscreen display displaying visual images and generating signals representative of a sensed location and magnitude of force applied to each of one or more touch points by a user to the touchscreen display; and
at least one programmable integrated circuit coupled to the touchscreen display, the at least one programmable integrated circuit providing signals generating the visual images on the touch screen display and receiving the signals from the touchscreen display representative of the sensed location and magnitude of force applied to each of the one or more touch points by the user to the touchscreen display;
where the at least one programmable integrated circuit is programmed to:
determine a key size based on the sensed magnitude of force; and
display a selected keyboard or keypad having multiple keyboard keys of the determined key size on the touchscreen display;
detect a location of a user's left hand as a group of leftmost touch points and detect a location of a user's right hand as a group of right most touch points;
determine an angle between the detected user's left hand and the detected user's right hand;
only if the determined angle is greater than or equal to a predefined angle threshold, display the selected keyboard as either:
a single unitary full text keyboard having left and right hand segments that are angled relative to each other according to the determined angle, or
separate left and right split text keyboard segments that are angled relative to each other according to the determined angle; and
only if the determined angle is less than the predefined angle threshold, display the selected keyboard as either:
a single unitary linear full text keyboard having all keys displayed in one or more rows of horizontally-aligned keys, or
separate left and right split text keyboard segments that are horizontally aligned with each other.

* * * * *